(12) United States Patent
Allen et al.

(10) Patent No.: US 12,555,026 B2
(45) Date of Patent: Feb. 17, 2026

(54) INTERPRETABLE HIERARCHICAL CLUSTERING

(71) Applicant: UnitedHealth Group Incorporated, Minnetonka, MN (US)

(72) Inventors: Ryan Allen, Onalaska, WI (US); Abhinav Agrawal, Gulabpura (IN)

(73) Assignee: UnitedHealth Group Incorporated, Minnetonka, MN (US)

( * ) Notice: Subject to any disclaimer, the term of this patent is extended or adjusted under 35 U.S.C. 154(b) by 1183 days.

(21) Appl. No.: 17/165,444

(22) Filed: Feb. 2, 2021

(65) Prior Publication Data

US 2022/0245509 A1 Aug. 4, 2022

(51) Int. Cl.
  *G06N 20/00* (2019.01)
  *G06N 5/02* (2023.01)

(52) U.S. Cl.
  CPC ............ *G06N 20/00* (2019.01); *G06N 5/02* (2013.01)

(58) Field of Classification Search
  CPC .................................. G06N 20/00; G06N 5/02
  See application file for complete search history.

(56) References Cited

U.S. PATENT DOCUMENTS

| | | | |
|---|---|---|---|
| 6,952,700 B2 | 10/2005 | Modha et al. | |
| 8,346,577 B2 | 1/2013 | Hogan et al. | |
| 9,589,045 B2 * | 3/2017 | Levitan | G06F 16/322 |
| 10,474,792 B2 | 11/2019 | Alstad et al. | |
| 2017/0124659 A1 | 5/2017 | Drennan, III et al. | |
| 2018/0300650 A1 | 10/2018 | Gebremariam | |
| 2021/0072255 A1 * | 3/2021 | Farokhzad | G06N 5/01 |

FOREIGN PATENT DOCUMENTS

KR  2019-0063175 A  6/2019

OTHER PUBLICATIONS

Pargent et al., "A benchmark experiment on how to encode categorical features in predictive modeling." Munchen: Ludwig-Maximilians-Universitat Munchen (Year: 2019).*
(Continued)

*Primary Examiner* — Adam C Standke
(74) *Attorney, Agent, or Firm* — Alston & Bird LLP

(57) ABSTRACT

There is a need for more effective and efficient hierarchical clustering. This need can be addressed by, for example, solutions for performing interpretable hierarchical clustering. In one example, a method includes performing a group of hierarchical clustering routines to generate a group of final hierarchical clusters; for each cluster-feature pair of a group of cluster-feature pairs, determining an intra-cluster variable importance measure, an incremental representation measure, and an overall variable importance based at least in part on the intra-cluster variable importance measure the incremental representation measure; generating predicted explanatory metadata for the group of hierarchical clustering routines based at least in part on each overall variable importance measure for each cluster-feature pair of the group of cluster-feature pairs; and performing one or more prediction-based actions based at least in part on the predicted explanatory metadata.

20 Claims, 8 Drawing Sheets

(56) References Cited

OTHER PUBLICATIONS

Chavent et al., "Combining clustering of variables and feature selection using random forests." arXiv preprint arXiv: 1608.067 40 (Year: 2018).*

Janitza, Silke et al., "A computationally fast variable importance test for random forests for high-dimensional data." Advances in Data Analysis and Classification 12.4 (Year: 2018).*

Hasan et al., "Hierarchical k-means: A hybrid clustering algorithm and its application to study gene expression in lung adenocarcinoma." Emerging Trends in Computational Biology, Bioinformatics, and Systems Biology: Algorithms and Software Tools (Year: 2015).*

"Feature Importance In k-Means Clustering," (Article, Online), (9 pages). [Retrieved from the Internet Apr. 5, 2021] URL: https://cran.r-project.org/web/packages/FeatureImpCluster/readme/README.html.

Arai, Kohei et al. "Hierarchical K-Means: An Algorithm for Centroids Initialization for K-Means," Reports of the Faculty of Science and Engineering, vol. 36, No. 1, Apr. 28, 2007, pp. 25-31, Saga University.

Chen, Bernard et al. "Novel Hybrid Hierarchical-K-Means Clustering Method (H-K-Means) for Microarray Analysis," In 2005 IEEE Computational Systems Bioinformatics Conference-Workshops (CSBW'05), Aug. 8, 2005, (4 pages). IEEE.

Gifford, Harry. "Hierarchical k-Means For Unsupervised Learning," (2013), pp. 1-5, Carnegie Mellon University.

Liu, Wenhua et al. "Improved Hierarchical k-Means Clustering Algorithm Without Iteration Based On Distance Measurement," In International Conference on Intelligent Information Processing, Oct. 17, 2014, pp. 38-46. Springer, Berlin, Heidelberg.

* cited by examiner

INTERPRETABLE HIERARCHICAL CLUSTERING

BACKGROUND

Various embodiments of the present invention address technical challenges related to performing interpretable unsupervised machine learning and address the efficiency and reliability shortcomings of existing unsupervised machine learning solutions.

BRIEF SUMMARY

In general, embodiments of the present invention provide methods, apparatus, systems, computing devices, computing entities, and/or the like for performing interpretable hierarchical clustering. Certain embodiments of the present invention utilize systems, methods, and computer program products that perform interpretable hierarchical clustering by utilizing intra-cluster variable importance measures, incremental representation measures, overall variable importance measures, and intra-cluster distance measures.

In accordance with one aspect, a method is provided. In one embodiment, the method comprises: performing a group of hierarchical clustering routines to generate a group of final hierarchical clusters, wherein each final hierarchical cluster of the group of final hierarchical clusters is associated with a group of related one-hot-encoded features and comprises a group of clustered input data objects; for each cluster-feature pair of a group of cluster-feature pairs that is associated with a final hierarchical cluster of the group of final hierarchical clusters and a related one-hot-encoded feature of the group of related one-hot-encoded features for the final hierarchical cluster: determining an intra-cluster variable importance measure for the cluster-feature pair that describes an inferred significance of the related one-hot-encoded feature associated with the cluster-feature pair to common clustering of the group of clustered input data objects in the final hierarchical cluster associated with the cluster-feature pair, determining an incremental representation measure for the cluster-feature pair that describes an inferred uniqueness of the related one-hot-encoded feature associated with the cluster-feature pair to the final hierarchical cluster associated with the cluster-feature pair, wherein the incremental representation measure for the cluster-feature pair is determined based at least in part on: (i) an expected occurrence count measure for the related one-hot-encoded feature associated with the cluster-feature pair within the final hierarchical cluster associated with the cluster-feature pair, and (ii) an actual occurrence count measure for the related one-hot-encoded feature associated with the cluster-feature pair within the final hierarchical cluster associated with the cluster-feature pair, and determining an overall variable importance measure for the cluster-feature pair based at least in part on the intra-cluster variable importance measure and the incremental representation for the cluster-feature pair; generating predicted explanatory metadata for the group of hierarchical clustering routines based at least in part on each overall variable importance measure for each cluster-feature pair of the group of cluster-feature pairs; and performing one or more prediction-based actions based at least in part on the predicted explanatory metadata.

In accordance with another aspect, a computer program product is provided. The computer program product may comprise at least one computer-readable storage medium having computer-readable program code portions stored therein, the computer-readable program code portions comprising executable portions configured to: perform a group of hierarchical clustering routines to generate a group of final hierarchical clusters, wherein each final hierarchical cluster of the group of final hierarchical clusters is associated with a group of related one-hot-encoded features and comprises a group of clustered input data objects; for each cluster-feature pair of a group of cluster-feature pairs that is associated with a final hierarchical cluster of the group of final hierarchical clusters and a related one-hot-encoded feature of the group of related one-hot-encoded features for the final hierarchical cluster: determine an intra-cluster variable importance measure for the cluster-feature pair that describes an inferred significance of the related one-hot-encoded feature associated with the cluster-feature pair to common clustering of the group of clustered input data objects in the final hierarchical cluster associated with the cluster-feature pair, determine an incremental representation measure for the cluster-feature pair that describes an inferred uniqueness of the related one-hot-encoded feature associated with the cluster-feature pair to the final hierarchical cluster associated with the cluster-feature pair, wherein the incremental representation measure for the cluster-feature pair is determined based at least in part on: (i) an expected occurrence count measure for the related one-hot-encoded feature associated with the cluster-feature pair within the final hierarchical cluster associated with the cluster-feature pair, and (ii) an actual occurrence count measure for the related one-hot-encoded feature associated with the cluster-feature pair within the final hierarchical cluster associated with the cluster-feature pair, and determine an overall variable importance measure for the cluster-feature pair based at least in part on the intra-cluster variable importance measure and the incremental representation for the cluster-feature pair; generate predicted explanatory metadata for the group of hierarchical clustering routines based at least in part on each overall variable importance measure for each cluster-feature pair of the group of cluster-feature pairs; and perform one or more prediction-based actions based at least in part on the predicted explanatory metadata.

In accordance with yet another aspect, an apparatus comprising at least one processor and at least one memory including computer program code is provided. In one embodiment, the at least one memory and the computer program code may be configured to, with the processor, cause the apparatus to: perform a group of hierarchical clustering routines to generate a group of final hierarchical clusters, wherein each final hierarchical cluster of the group of final hierarchical clusters is associated with a group of related one-hot-encoded features and comprises a group of clustered input data objects; for each cluster-feature pair of a group of cluster-feature pairs that is associated with a final hierarchical cluster of the group of final hierarchical clusters and a related one-hot-encoded feature of the group of related one-hot-encoded features for the final hierarchical cluster: determine an intra-cluster variable importance measure for the cluster-feature pair that describes an inferred significance of the related one-hot-encoded feature associated with the cluster-feature pair to common clustering of the group of clustered input data objects in the final hierarchical cluster associated with the cluster-feature pair, determine an incremental representation measure for the cluster-feature pair that describes an inferred uniqueness of the related one-hot-encoded feature associated with the cluster-feature pair to the final hierarchical cluster associated with the cluster-feature pair, wherein the incremental representation measure for the cluster-feature pair is determined based at least in part on: (i) an expected occurrence count measure for the related one-hot-encoded feature associated with the cluster-feature pair within the final hierarchical cluster associated with the cluster-feature pair, and (ii) an actual occurrence count measure for the related one-hot-encoded feature associated with the cluster-feature pair within the final hierarchical cluster associated with the cluster-feature pair, and determine an overall variable importance measure for the cluster-feature pair based at least in part on the intra-cluster variable importance measure and the incremental representation for the cluster-feature pair; generate predicted explanatory metadata for the group of hierarchical clustering routines based at least in part on each overall variable importance measure for each cluster-feature pair of the group of cluster-feature pairs; and perform one or more prediction-based actions based at least in part on the predicted explanatory metadata.

BRIEF DESCRIPTION OF THE DRAWINGS

Figure 1:
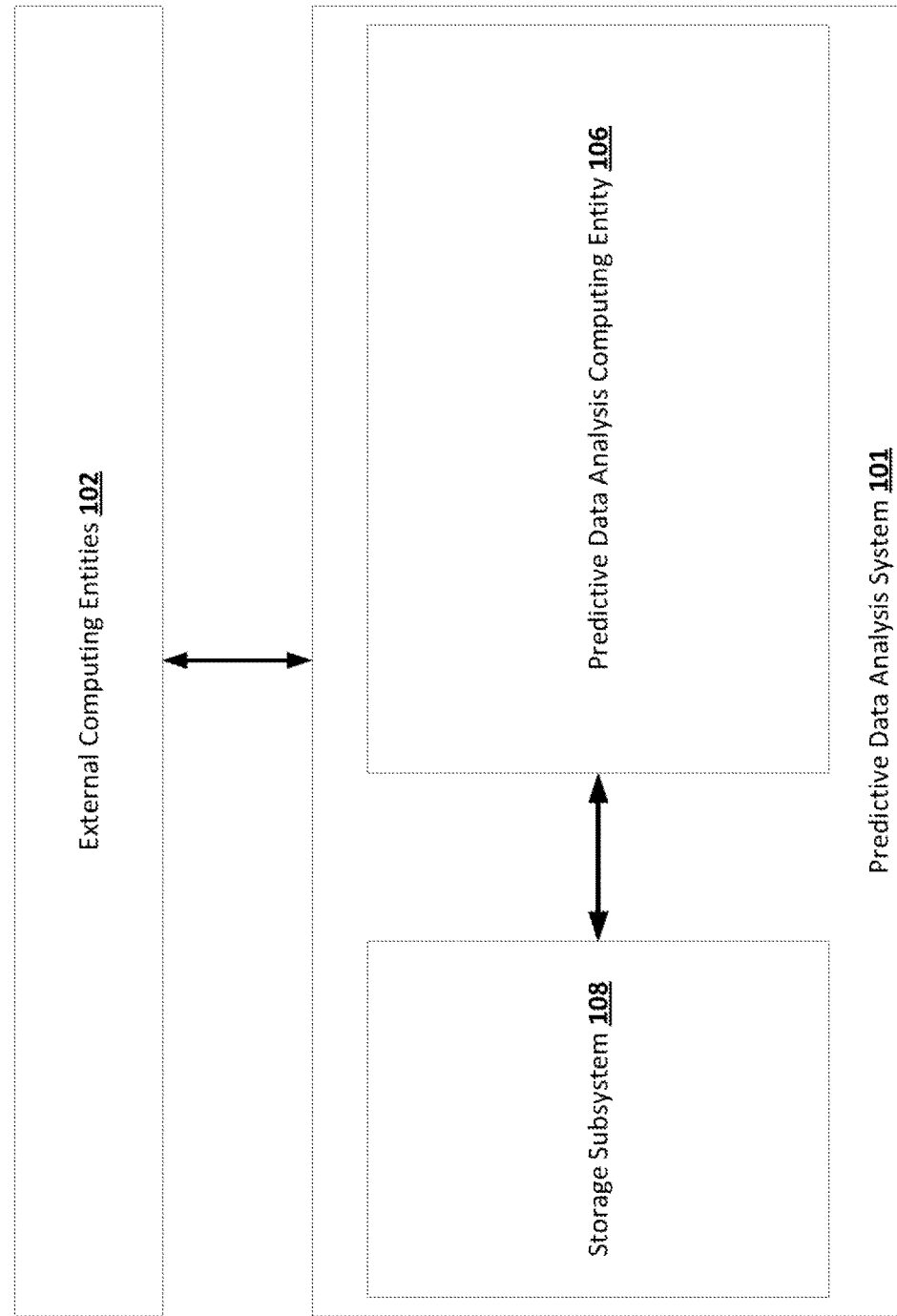

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
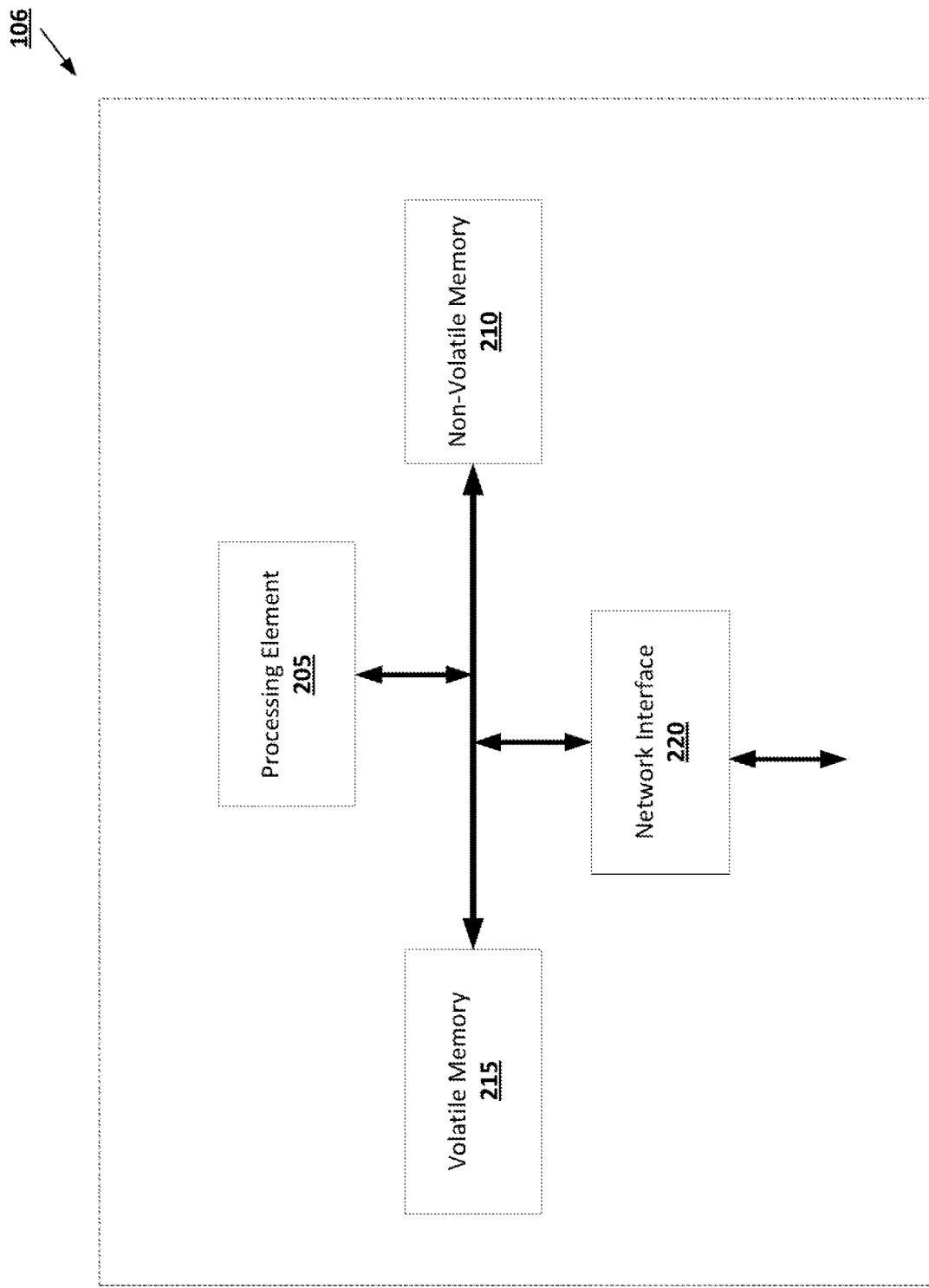

FIG. 2 provides an example predictive data analysis computing entity in accordance with some embodiments discussed herein.

Figure 3:
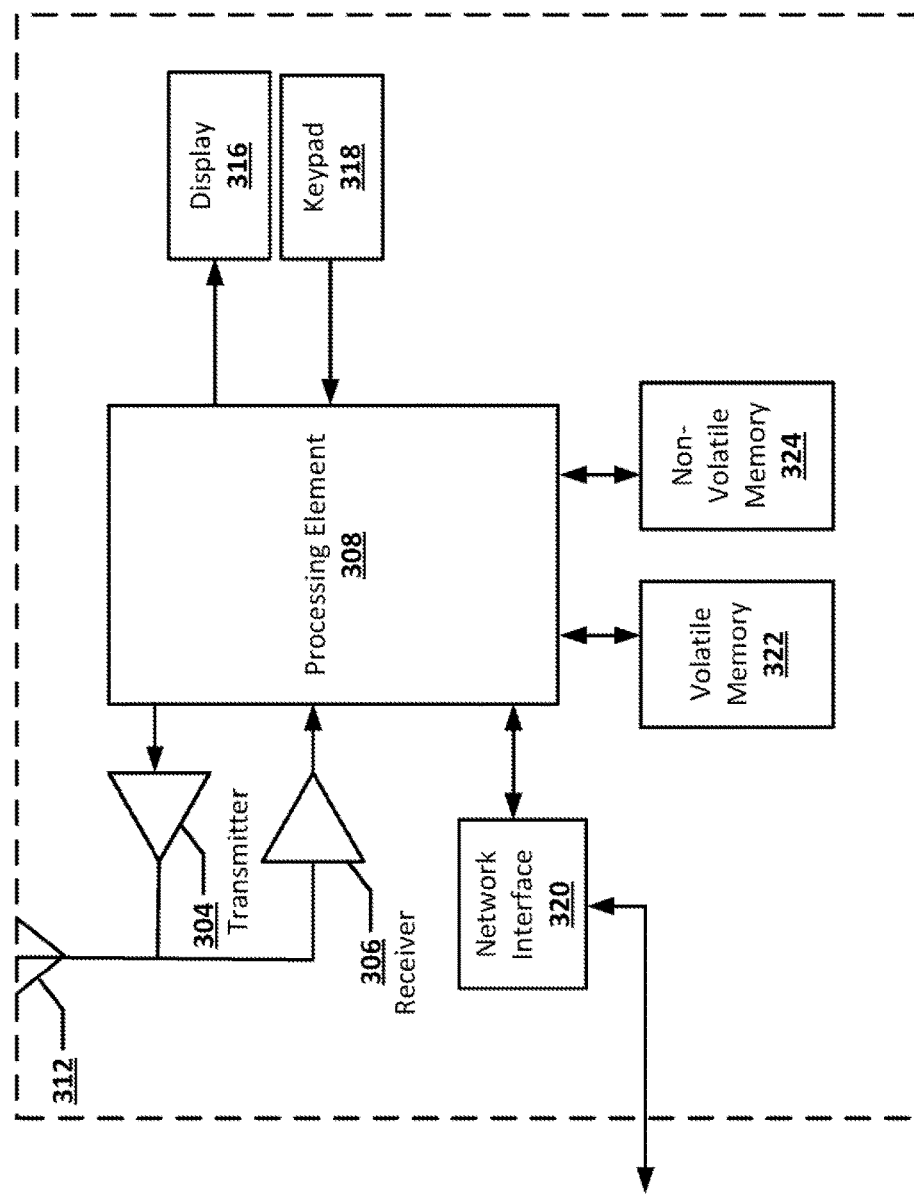

FIG. 3 provides an example external computing entity in accordance with some embodiments discussed herein.

Figure 4:
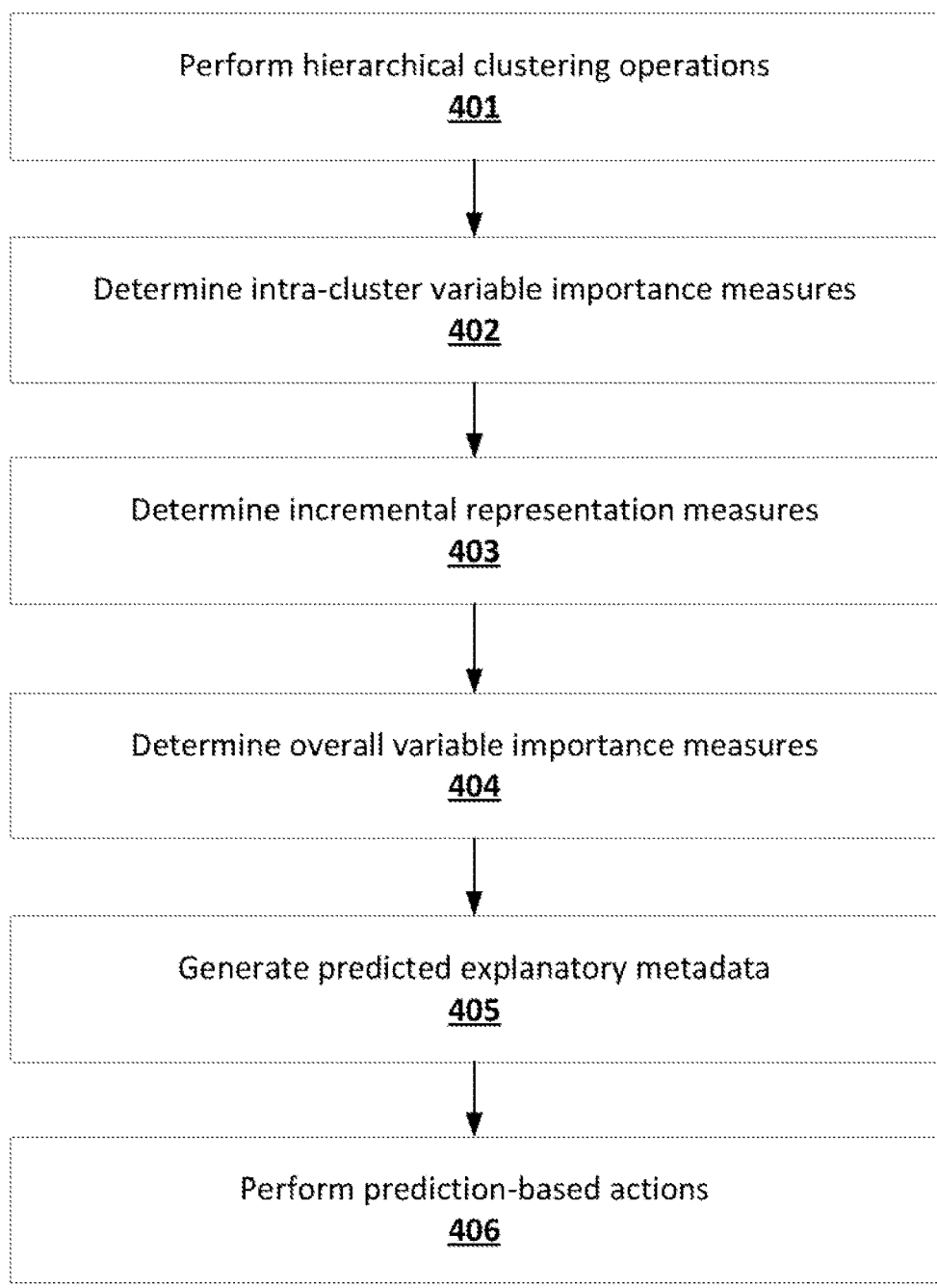

FIG. 4 is a flowchart diagram of an example process for performing interpretable hierarchical clustering in accordance with some embodiments discussed herein.

Figure 5:
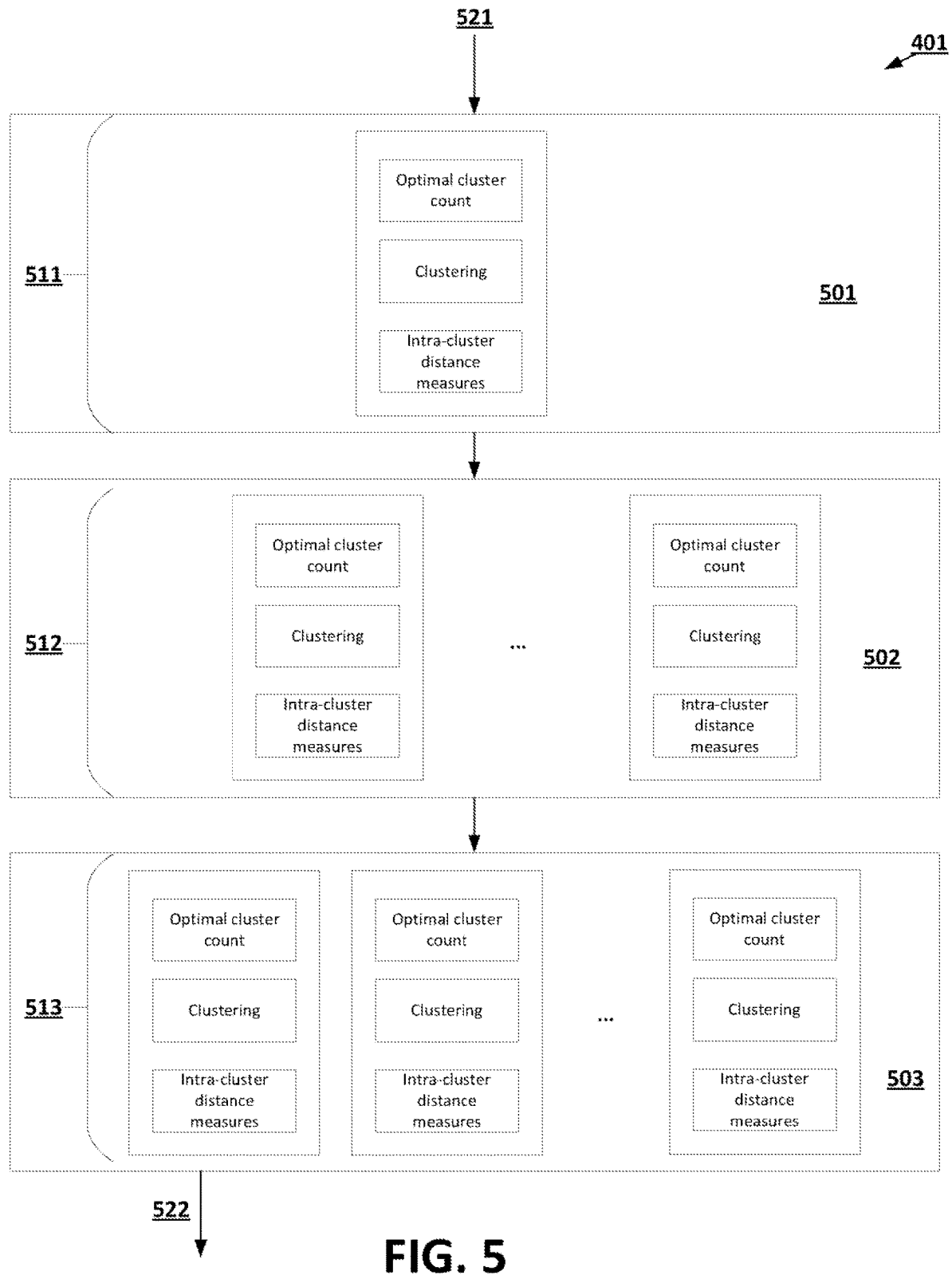

FIG. 5 provides an operational example of performing a group of hierarchical clustering operations in accordance with some embodiments discussed herein.

Figure 6:
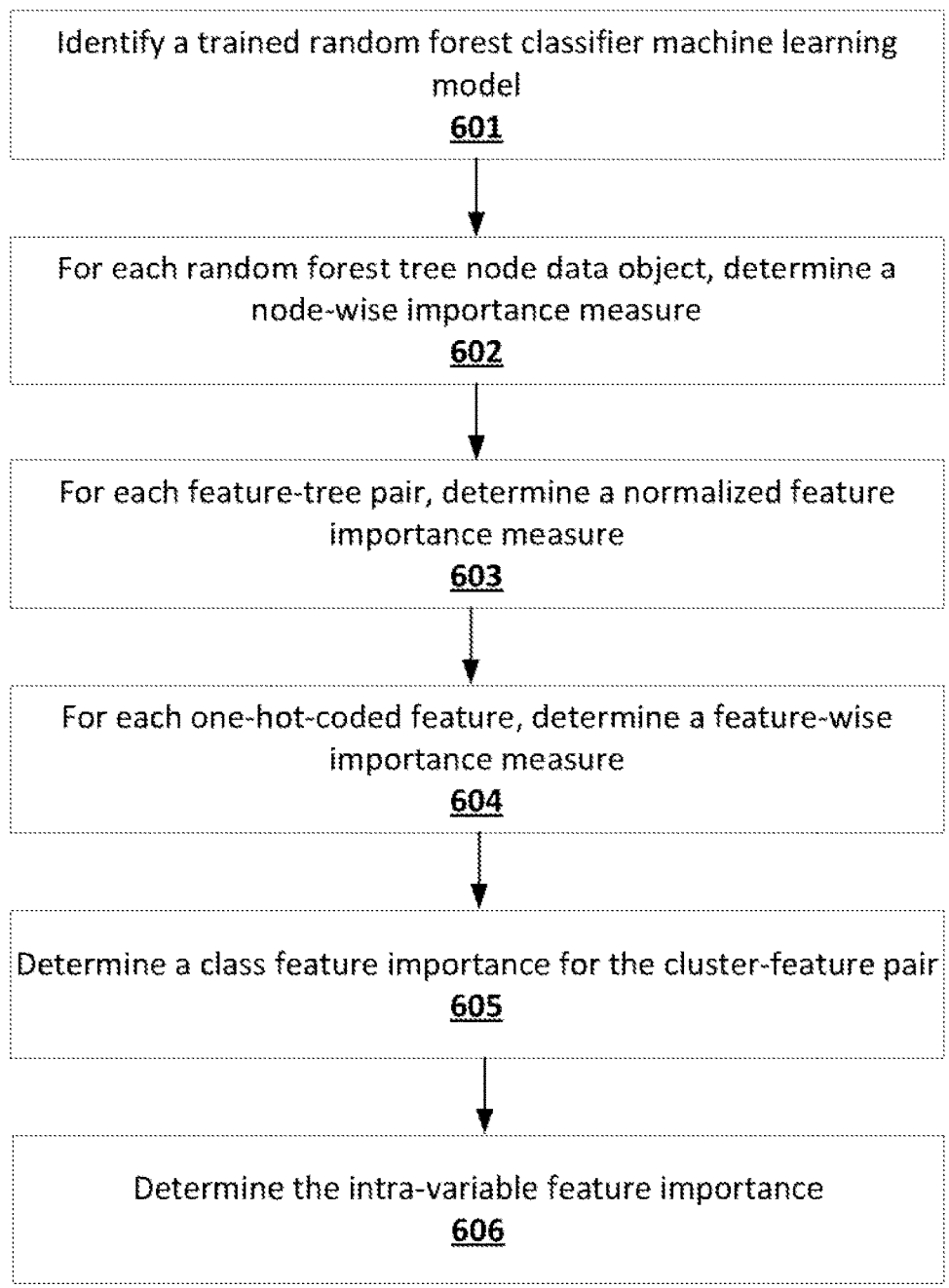

FIG. 6 is a flowchart diagram of an example process for determining an intra-cluster variable importance measure for a cluster-feature pair in accordance with some embodiments discussed herein.

Figure 7:
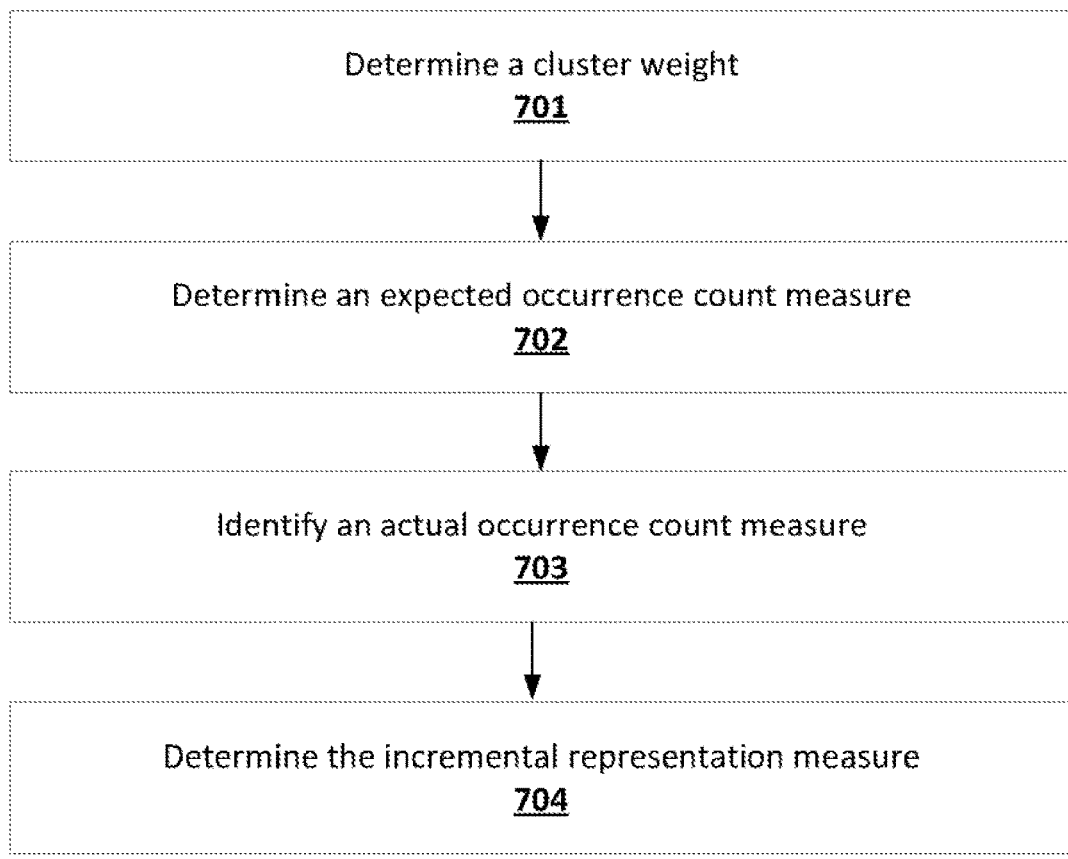

FIG. 7 is a flowchart diagram of an example process for determining an incremental representation measure for a cluster-feature pair in accordance with some embodiments discussed herein.

Figure 8:
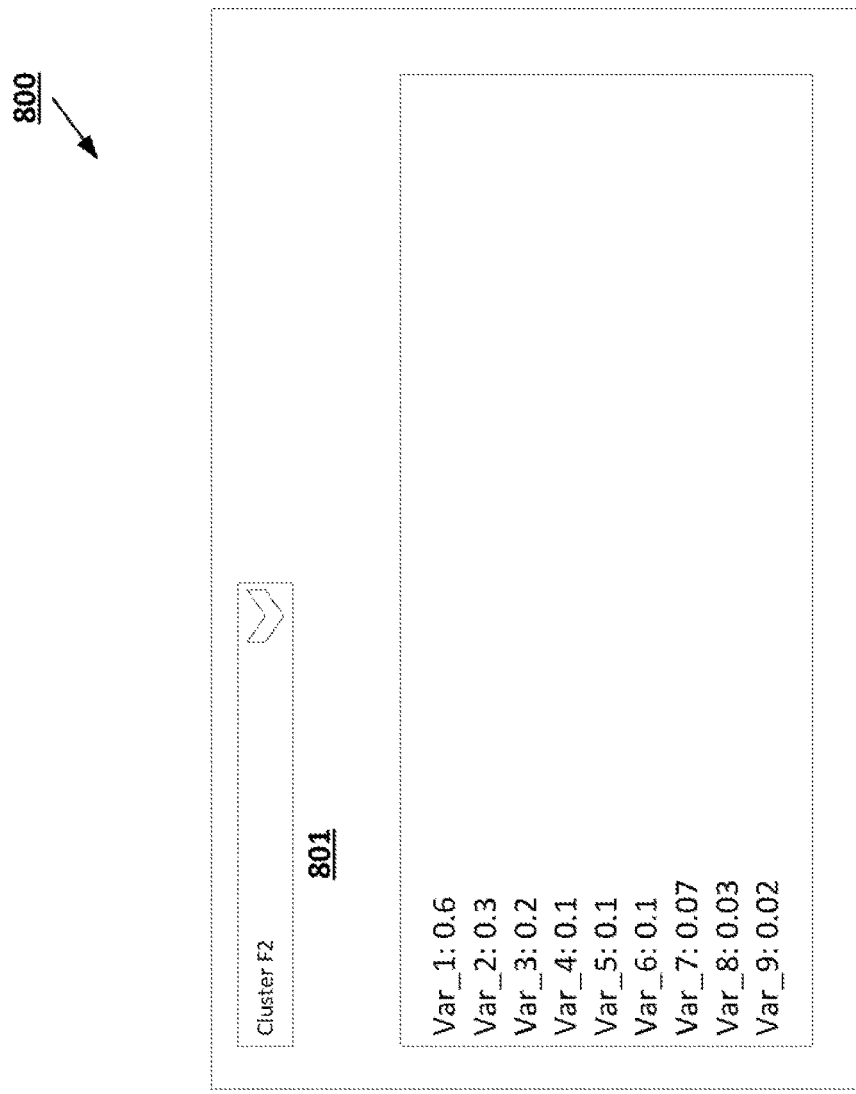

FIG. 8 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present invention address technical challenges related to increasing efficiency of unsupervised machine learning solutions. For example, various embodiments of the present invention improve the computational efficiency of performing hierarchical clustering by executing multiple k-means clustering routines in a hierarchical fashion, an approach that is more efficient than existing hierarchical clustering methods such as the balanced iterative reducing and clustering using hierarchies (BIRCH) method. Accordingly, performing hierarchical clustering by executing multiple k-means clustering routines in a hierarchical fashion reduces the computational complexity of performing hierarchical clustering and reduces the amount of computational/processing resources needed to perform hierarchical clustering operations.

An example application of various embodiments of the present invention relates to claim remediation processes. During a claims remediation process, teams of claims analysts are tasked with identifying the root cause of various adjudication errors. Often, the sheer volume of claims makes finding errors using current business intelligence technologies and reports difficult and time consuming. Because of this, new errors have a high likelihood of going unfound and not resolved in a timely fashion. Various embodiments of the present invention are designed to simplify this error detection process by creating hierarchies of segments based on similar claims that are easily traversable in granularity and make analysis of these claims easy and understandable.

Various embodiments of the present invention seek to improve the interpretability of clustering algorithms, especially when dealing with hierarchical structures of unsupervised learning segments. In order to facilitate claims analytics, the makeup of the clusters is identified using three methodologies: one to understand the viability of each cluster, one to identify key drivers within a cluster, and one to determine important variables unique to each segment.

II. DEFINITIONS

The term "hierarchical clustering routine" may refer to a data entity that is configured to describe a computer-implemented process that is configured to perform one or both of the following operations: (i) cluster an input cluster generated by a parent hierarchical clustering routine to generate a group of resultant clusters, and (ii) cluster an input data tier to generate group of resultant clusters and provide each resultant cluster of the group of resultant clusters as an input cluster to a child hierarchical clustering routine of a group of child hierarchical clustering routines for the particular hierarchical clustering routine. A hierarchical clustering routine may be associated with a hierarchical clustering level that defines a hierarchical position of the hierarchical clustering routine in relation to other hierarchical clustering routines, such that a hierarchical clustering level may include a group of hierarchical clustering routines having a common hierarchical position in relation to other hierarchical clustering routines. In this manner, the hierarchical clustering routines in a group of final hierarchical clusters can be divided into two groups: (i) an initial (i.e., first-level) hierarchical clustering routine that is in a first hierarchical clustering level, where the initial hierarchical clustering routine is configured to process an input data tier for the hierarchical clustering to generate a group of resultant clusters and provide each resultant cluster to a second-level hierarchical clustering routine of a group of second-level hierarchical clustering routines that are associated with a second hierarchical cluster level; and (ii) a non-initial subset of hierarchical clustering routines that includes each hierarchical clustering routine of the group of hierarchical clustering routines other than the initial hierarchical clustering routine, where each hierarchical clustering routine in the non-initial subset is configured to cluster an input cluster generated by a parent hierarchical clustering routine to generate a group of resultant clusters. Moreover, the non-initial subset of hierarchical clustering routines includes: (i) a group of non-final hierarchical clustering routines, where each non-final hierarchical clustering routine is associated with an nth non-final hierarchical clustering level and is configured to cluster an input cluster generated by a parent hierarchical clustering routine in a (n−1)th hierarchical clustering level to generate a group of resultant clusters and provide each resultant cluster to a child hierarchical clustering routine in a (n+1)th hierarchical clustering level; and (ii) a group of final hierarchical clustering routines, where each final hierarchical clustering routine is associated with a final hierarchical clustering level and is configured to cluster an input cluster generated by a parent hierarchical clustering routine in a pre-final hierarchical clustering level to generate a group of resultant clusters.

The term "hierarchical clustering level" may refer to a data entity that is configured to describe a group of hierarchical clustering routines having a common hierarchical position in relation to other hierarchical clustering routines. For example, consider a clustering hierarchy that includes three hierarchical clustering levels: an initial hierarchical clustering level that includes the hierarchical clustering routine R1; a second non-initial non-final hierarchical clustering level that includes the hierarchical clustering routines R2-R4, where hierarchical clustering routines R2-R4 are children of the hierarchical clustering routine R1; and a third non-initial final hierarchical clustering level that includes the hierarchical clustering routines R5-R13, where hierarchical clustering routines R5-R7 are children of the hierarchical clustering routine R2, hierarchical clustering routines R8-R10 are children of the hierarchical clustering routine R3, and hierarchical clustering routines R11-R13 are children of the hierarchical clustering routine R4.

In the above-described example: (i) the hierarchical clustering routine R1 is configured to process an input data tier to generate three resultant clusters and provide a first resultant cluster to the hierarchical clustering routine R2, a second resultant cluster to the hierarchical clustering routine R3, and a third resultant cluster to the hierarchical clustering routine R4; (ii) the hierarchical clustering routine R2 is configured to process the first resultant cluster generated by the hierarchical clustering routine R1 to generate three resultant clusters and provide a first resultant cluster to the hierarchical clustering routine R5, a second resultant cluster to the hierarchical clustering routine R6, and a third resultant cluster to the hierarchical clustering routine R7; (iii) the hierarchical clustering routine R3 is configured to process the second resultant cluster generated by the hierarchical clustering routine R1 to generate three resultant clusters and provide a first resultant cluster to the hierarchical clustering routine R8, a second resultant cluster to the hierarchical clustering routine R9, and a third resultant cluster to the hierarchical clustering routine R10; (iv) the hierarchical clustering routine R4 is configured to process the third resultant cluster generated by the hierarchical clustering routine R1 to generate three resultant clusters and provide a first resultant cluster to the hierarchical clustering routine R11, a second resultant cluster to the hierarchical clustering routine R12, and a third resultant cluster to the hierarchical clustering routine R13; (v) the hierarchical clustering routine R5 is configured to process the first resultant cluster generated by the hierarchical clustering routine R2 to generate an optimal number of final hierarchical clusters; (vi) the hierarchical clustering routine R6 is configured to process the second resultant cluster generated by the hierarchical clustering routine R2 to generate an optimal number of final hierarchical clusters; (vii) the hierarchical clustering routine R7 is configured to process the third resultant cluster generated by the hierarchical clustering routine R2 to generate an optimal number of final hierarchical clusters; (viii) the hierarchical clustering routine R8 is configured to process the first resultant cluster generated by the hierarchical clustering routine R3 to generate an optimal number of final hierarchical clusters; (ix) the hierarchical clustering routine R9 is configured to process the second resultant cluster generated by the hierarchical clustering routine R3 to generate an optimal number of final hierarchical clusters; (x) the hierarchical clustering routine R10 is configured to process the third resultant cluster generated by the hierarchical clustering routine R3 to generate an optimal number of final hierarchical clusters; (xi) the hierarchical clustering routine R11 is configured to process the first resultant cluster generated by the hierarchical clustering routine R4 to generate an optimal number of final hierarchical clusters; (xii) the hierarchical clustering routine R12 is configured to process the second resultant cluster generated by the hierarchical clustering routine R4 to generate an optimal number of final hierarchical clusters; and (xii) the hierarchical clustering routine R13 is configured to process the third resultant cluster generated by the hierarchical clustering routine R4 to generate an optimal number of final hierarchical clusters.

The term "optimal cluster count" may refer to a data entity that is configured to describe a number of desired clusters to generate by a hierarchical clustering routine in order to maximize a clustering accuracy and/or a clustering efficiency of the hierarchical clustering routine. In some embodiments, to determine the optimal cluster count for a particular hierarchical clustering routine, a predictive data analysis computing entity is configured to: (i) identify a group of input data objects associated with the resultant cluster (e.g., for an initial hierarchical clustering routine, this group may entail the input data tier, while for a non-initial hierarchical clustering routine, this group may entail a corresponding resultant cluster generated by a parent hierarchical clustering routine); (ii) identify (e.g., generate) a plurality of candidate clustering arrangements for the group of input data objects, where each candidate clustering arrangement is associated with a cluster count and associates each input data object of the group of input data objects to a proposed cluster; (iii) for each candidate clustering arrangement of the plurality of candidate clustering arrangements, determine a silhouette intra-cluster distance measure for the input cluster in relation to the candidate clustering arrangement (e.g., where the silhouette intra-cluster distance measure for a candidate clustering arrangement may describe a measure of how proximate each input data object is to the proposed cluster for the input data object in accordance with the candidate clustering arrangement and how distant each input data object is to clusters other than the proposed cluster for the input data object in accordance with the candidate clustering arrangement); and (iv) determine the optimal cluster count based at least in part on a cluster count of the candidate clustering arrangement of the plurality of candidate clustering arrangements that has a lowest silhouette intra-cluster distance measure.

The term "intra-cluster distance measure" may refer to a data entity that is configured to describe a measure of similarity of the clustered input data objects that are deemed to be in a cluster. The intra-cluster distance measure for a cluster may provide predictive insights about which clusters can be ignored due to having a large volume of dissimilar clustered data objects (e.g., a large volume of dissimilar claim data objects). In some embodiments, the intra-cluster distance measure for a cluster is determined based at least in part on a mean vector normalization of each clustered data object in the cluster minus the cluster centroid (e.g., the cluster mean). In some embodiments, the intra-cluster distance measure for a cluster is determined by performing the following operations: (i) identifying a group of input data objects associated with the cluster (e.g., for an initial hierarchical clustering routine, this group may entail the input data tier, while for a non-initial hierarchical clustering routine, this group may entail a corresponding resultant cluster generated by a parent hierarchical clustering routine); (ii) for each input data object of the group of input data objects, determining a point-centroid distance measure of the input data object from a centroid data object (e.g., a mean data object) for the resultant cluster; and (iii) determining an intra-cluster distance measure for the resultant cluster based at least in part on each noted point-centroid distance measure for an input data object of the group of input data objects.

The term "intra-cluster variable importance measure" may refer to a data entity that is configured to describe an inferred significance of a one-hot-encoded feature to common clustering of a group of clustered input data objects in a particular cluster. In some embodiments, the intra-cluster variable importance measures for a group of one-hot-encoded features with respect to a group of clusters may be determined based at least in part on training a classifier machine learning model that classifies a group of input data objects into a group of classifications determined based at least in part on the group of clusters, and then determining feature importance measures for the one-hot-encoded features with respect to the group of classifications as determined based at least in part on performing feature importance determinations operations with respect to the trained classifier machine learning model. For example, in some embodiments, the intra-cluster variable importance measures for a group of one-hot-encoded features with respect to a group of clusters may be determined based at least in part on training a random forest classifier machine learning model that classifies a group of input data objects into a group of classifications determined based at least in part on the group of clusters, and then determining feature importance measures for the one-hot-encoded features with respect to the group of classifications as determined based at least in part on performing feature importance determinations operations with respect to the trained random forest classifier machine learning model.

The term "related one-hot-encoded feature" may refer to a data entity that is configured to describe a one-hot-encoded feature (i.e., a Boolean-valued feature) whose corresponding value is affirmative for at least one clustered data object in a corresponding cluster. For example, consider a cluster that includes three claim data objects C1-C3 as well a one-hot-encoded feature that describes whether a claim data object is associated with a particular International Classification of Disease (ICD) code. In the noted example, the one-hot-encoded feature is deemed related to the cluster if at least one of the following conditions is deemed true: (i) the claim data object C1 is associated with the particular ICD code, (ii) the claim data object C2 is associated with the particular ICD code, and (iii) the claim data object C3 is associated with the particular ICD code.

The term "trained random forest classifier machine learning model" may refer to a data entity that is configured to describe a machine learning model that includes a number of random tree forest data objects. Each random forest tree data object may describe a group of hierarchical decisions each corresponding to a random forest tree node data object, where hierarchical decisions at a final hierarchical level lead to determining a classification for an input data object. For example, an exemplary random forest tree data object may describe that following hierarchy of decision making operations: (i) if an input data object has an affirmative value for one-hot-encoded feature F1, take branch B1_1, otherwise take branch B1_2; (ii) in branch B1_1, if the input data object has an affirmative value for one-hot-encoded feature F2, take branch B2_1, otherwise, take branch B2_2; (iii) in branch B1_2, if the input data object has an affirmative value for one-hot-encoded feature F3, take branch B3_1, otherwise, take branch B3_2; (iv) in branch B2_1, if the input data object has an affirmative value for one-hot-encoded feature F3 classify as C1, otherwise classify as C2; (v) in branch B2_2, if the input data object has an affirmative value for one-hot-encoded feature F4 classify as C3, otherwise classify as C2; (vi) in branch B3_1, if the input data object has an affirmative value for one-hot-encoded feature F4 classify as C1, otherwise classify as C3; and (vii) in branch B3_3, if the input data object has an affirmative value for one-hot-encoded feature F2 classify as C3, otherwise classify as C2. In the noted example, each of the decision making operations described in (iv)-(vii) corresponds to a random forest tree node data object. As illustrated by this example, each random forest tree node data object corresponds to a one-hot-encoded feature: random forest tree node data object (i) corresponds to the one-hot-encoded feature F1, random forest tree node data object (ii) corresponds to the one-hot-encoded feature F2, random forest tree node data object (iii) corresponds to the one-hot-encoded feature F3, random forest tree node data object (iv) corresponds to the one-hot-encoded feature F3, random forest tree node data object (v) corresponds to the one-hot-encoded feature F4, random forest tree node data object (vi) corresponds to the one-hot-encoded feature F4, and random forest tree node data object (vii) corresponds to the one-hot-encoded feature F2.

The term "node-wise importance measure" may refer to a data entity that is configured to describe an inferred importance of a corresponding random forest tree node data object to a random forest tree data object that includes the random forest tree node data object. In some embodiments, the node-wise feature importance measure for a random forest tree node data object n in a random forest tree data object t is determined based at least in part on the output of equation: [(total number of input data objects that reach n (e.g., that are provided as inputs to n after successfully passing prior decision making operations that lead to n)/total number of input data objects that are provided as inputs to t)*an inferred impurity measure for input data objects that reach n]−[(total number of input data objects that satisfy n/total number of input data objects that are provided as inputs to t)*an inferred impurity measure for those input data objects that satisfy n]−[(total number of input data objects that fail to satisfy n/total number of input data objects that are provided as inputs to t)*an inferred impurity measure for those input data objects that fail to satisfy n].

The term "normalized feature importance measure" may refer to a data entity that is configured to describe an inferred importance of a one-hot-encoded feature (which may be associated with one or more random forest tree node data objects in a random forest tree data object) associated with a feature-tree pair and a random forest tree data object associated with the feature-tree pair. Because a particular one-hot-encoded feature may be associated with two or more random forest tree node data objects, in some embodiments, each node-wise importance measure for a random forest tree node data object that is both associated with the particular one-hot-encoded feature and is in a particular random forest tree data object should be combined to generate the normalized feature importance measure for a feature-tree pair that includes the particular one-hot-encoded feature and the particular random forest tree data object. In some embodiments, the normalized feature importance measure for a one-hot-encoded feature may be determined by normalizing the non-normalized feature importance measure for the one-hot-encoded feature in accordance with the sum of non-normalized feature importance measures for all one-hot-encoded features used to generate the random forest classification machine learning model that includes the corresponding random forest tree data object, e.g., based at least in part on the output of the equation: [non-normalized feature importance measures for a particular one-hot-encoded feature in relation to a particular random forest tree data object]/[sum of non-normalized feature importance measures for all one-hot-encoded features in relation to the particular random forest tree data object]. In some embodiments, the non-normalized feature importance measure for a one-hot-encoded feature f in relation to a random forest tree data object t is determined using the equation: [(sum of node-wise importance measures for all random forest tree node data objects in t that correspond to f)/(sum of all node-wise importance measures for all random forest tree node data objects in t)].

The term "feature-wise importance measure" may refer to a data entity that is configured to describe an inferred importance of a corresponding one-hot-encoded feature to all of the random forest tree data objects associated with a random forest classification machine learning model. The feature-wise importance measure for a particular one-hot-encoded feature may be determined by combining each normalized feature importance measure for a feature-tree pair that includes the particular one-hot-encoded feature. In some embodiments, the feature-wise importance for a one-hot-encoded feature f across a set of random forest tree data objects T is determined based at least in part on the output of: [sum of all normalized feature importance measures for f across T/count of random forest tree data objects in T].

The term "class feature importance" may refer to a data entity that is configured to describe an inferred significance of a one-hot-encoded feature to determining a classification associated with a corresponding cluster. In some embodiments, determining a class feature importance measure for a related one-hot-encoded feature that is associated with a cluster-feature pair to a final hierarchical cluster that is associated with the cluster-feature pair is performed based at least in part on a mean of each feature split for the related one-hot-encoded feature across a classification that is associated with the final hierarchical cluster.

The term "incremental representation measure" may refer to a data entity that is configured to describe an inferred uniqueness of a one-hot-encoded feature associated with a cluster-feature pair to the cluster associated with the cluster-feature pair. The incremental representation measure for a cluster-feature pair may provide predictive insights about which one-hot-encoded features are most unique to a cluster, and which are ubiquitous across all/most clusters. This may enable a claims analyst to quickly identify which one-hot-encoded features can be focused on as potentially interesting based at least in part on them being specific to a cluster versus homogenous across the entire claims data set. In some embodiments, an incremental representation measure for a cluster-feature pair may be determined based at least in part on: (i) an expected occurrence count measure for the one-hot-encoded feature associated with the cluster-feature pair within the cluster associated with the cluster-feature pair, and (ii) an actual occurrence count measure for the one-hot-encoded feature associated with the cluster-feature pair within the cluster associated with the cluster-feature pair.

The term "cluster weight" may refer to a data entity that is configured to describe a ratio of the count of clustered data objects in a cluster (i.e., the intra-cluster count of the cluster) to the total count of data objects in the input data tier associated with a hierarchical clustering performed to generate the particular cluster. In some embodiments, the cluster weight for a cluster c in a cluster hierarchy h is determined based at least in part on the output of: [count of clustered data objects in c/count of input data objects provided as inputs to h].

The term "expected occurrence count measure" may refer to a data entity that is configured to describe an expected count of clustered data objects in a corresponding cluster that are expected to have an affirmative value for a corresponding one-hot-encoded feature. In some embodiments, the expected occurrence count measure for a cluster-feature pair is determined based at least in part on the cluster weight for the cluster in the cluster-feature pair and a total occurrence count measure for the one-hot-encoded feature across the input data tier (i.e., the count of all input data objects in the input data tier that have an affirmative value for the one-hot-encoded feature). In some embodiments, the expected occurrence count measure for a cluster-feature pair that includes a cluster c and a feature f is determined based at least in part on the output of: [count of affirmative occurrence off across the input data tier/cluster weight for c].

The term "actual occurrence count measure" may refer to a data entity that is configured to describe an actual count of clustered data objects in a corresponding cluster that have an affirmative value for a corresponding one-hot-encoded feature. For example, consider a cluster that includes three claim data objects C1-C3 as well a one-hot-encoded feature that describes whether a claim data object is associated with a particular International Classification of Disease (ICD) code. In the noted example, if C1 and C3 have the particular ICD code but C2 does not have the particular ICD code, then the actual occurrence count measure for the one-hot-encoded feature with respect to the cluster may be two.

The term "overall variable importance measure" may refer to a data entity that is configured to describe an inferred significance of a one-hot-encoded feature associated with a cluster-feature pair to a cluster associated with the cluster-feature pair and an inferred uniqueness of the one-hot-encoded feature associated with the cluster-feature pair to the cluster associated with the cluster-feature pair. In some embodiments, the overall variable importance measure for a cluster-feature pair is determined based at least in part on an intra-cluster variable importance measure for the cluster-feature pair and an incremental representation measure for the cluster-feature pair. In some embodiments, the overall variable importance measure for a cluster-feature pair that includes a cluster c and a feature f is determined based at least in part on the output of: [(2\*intra-cluster variable importance measure for c and f\*incremental representation measure for c and j)/(intra-cluster variable importance measure for c and f+ incremental representation measure for c and j)].

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions. An example of a prediction that can be generated using the predictive data analysis system 101 is a prediction about generating hierarchical clusters of health insurance claims along with predicted explanatory metadata for the noted hierarchical clustering of the health insurance claims.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Various embodiments of the present invention address technical challenges related to increasing efficiency of unsupervised machine learning solutions by introducing techniques for generating predicted explanatory metadata for hierarchical clustering routines. Generating predicted explanatory metadata for hierarchical clustering routines causes the clusters generated using the noted hierarchical clustering routines to be deemed more reliable by end-users, which in turn decreases the likelihood that such end-users will attempt to perform further iterations/epochs of hierarchical clustering routines, and thus decreases the overall processing power and storage resources needed to support training of unsupervised machine learning models. In this manner, various embodiments of the present invention reduce the computational load and storage load on unsupervised machine learning frameworks that are configured to perform hierarchical clustering by reducing the amount of processing cycles needed to generate acceptable hierarchical clusters and/or by reducing the amount of storage resources needed for performing hierarchical clustering routines. Furthermore, various embodiments of the present invention improve the computational efficiency of performing hierarchical clustering by executing multiple k-means clustering routines in a hierarchical fashion, an approach that is more efficient than existing hierarchical clustering methods such as the balanced iterative reducing and clustering using hierarchies (BIRCH) method.

FIG. 4 is a flowchart diagram of an example process 400 for performing interpretable hierarchical clustering. Via the various steps/operations of the process 400, the predictive data analysis computing entity 106 can efficiently and effectively generate overall variable importance measures that describe inferred importance of a one-hot-encoded feature to a final hierarchical cluster generated using a hierarchical clustering scheme.

The process 400 begins at step/operation 401 when the predictive data analysis computing entity 106 performs a group of hierarchical clustering routines to generate a group of final hierarchical clusters, where each final hierarchical cluster of the group of final hierarchical clusters is associated with a group of related one-hot-encoded features and comprises a group of clustered input data objects.

A hierarchical clustering routine may be a computer-implemented process that is configured to perform one or both of the following operations: (i) cluster an input cluster generated by a parent hierarchical clustering routine to generate a group of resultant clusters, and (ii) cluster an input data tier to generate group of resultant clusters and provide each resultant cluster of the group of resultant clusters as an input cluster to a child hierarchical clustering routine of a group of child hierarchical clustering routines for the particular hierarchical clustering routine. A hierarchical clustering routine may be associated with a hierarchical clustering level that defines a hierarchical position of the hierarchical clustering routine in relation to other hierarchical clustering routines, such that a hierarchical clustering level may include a group of hierarchical clustering routines having a common hierarchical position in relation to other hierarchical clustering routines. In this manner, the hierarchical clustering routines in a group of final hierarchical clusters can be divided into two groups: (i) an initial (i.e., first-level) hierarchical clustering routine that is in a first hierarchical clustering level, where the initial hierarchical clustering routine is configured to process an input data tier for the hierarchical clustering to generate a group of resultant clusters and provide each resultant cluster to a second-level hierarchical clustering routine of a group of second-level hierarchical clustering routines that are associated with a second hierarchical clustering level; and (ii) a non-initial subset of hierarchical clustering routines that includes each hierarchical clustering routine of the group of hierarchical clustering routines other than the initial hierarchical clustering routine, where each hierarchical clustering routine in the non-initial subset is configured to cluster an input cluster generated by a parent hierarchical clustering routine to generate a group of resultant clusters. Moreover, the non-initial subset of hierarchical clustering routines includes: (i) a group of non-final hierarchical clustering routines, where each non-final hierarchical clustering routine is associated with an nth non-final hierarchical clustering level and is configured to cluster an input cluster generated by a parent hierarchical clustering routine in a (n−1)th hierarchical clustering level to generate a group of resultant clusters and provide each resultant cluster to a child hierarchical clustering routine in a (n+1)th hierarchical clustering level; and (ii) a group of final hierarchical clustering routines, where each final hierarchical clustering routine is associated with a final hierarchical clustering level and is configured to cluster an input cluster generated by a parent hierarchical clustering routine in a pre-final hierarchical clustering level to generate a group of resultant clusters.

Thus, as described above, a hierarchical clustering level may include a group of hierarchical clustering routines having a common hierarchical position in relation to other hierarchical clustering routines. For example, consider a clustering hierarchy that includes three hierarchical clustering levels: an initial hierarchical clustering level that includes the hierarchical clustering routine R1; a second non-initial non-final hierarchical clustering level that includes the hierarchical clustering routines R2-R4, where hierarchical clustering routines R2-R4 are children of the hierarchical clustering routine R1; and a third non-initial final hierarchical clustering level that includes the hierarchical clustering routines R5-R13, where hierarchical clustering routines R5-R7 are children of the hierarchical clustering routine R2, hierarchical clustering routines R8-R10 are children of the hierarchical clustering routine R3, and hierarchical clustering routines R11-R13 are children of the hierarchical clustering routine R4.

In the above-described example: (i) the hierarchical clustering routine R1 is configured to process an input data tier to generate three resultant clusters and provide a first resultant cluster to the hierarchical clustering routine R2, a second resultant cluster to the hierarchical clustering routine R3, and a third resultant cluster to the hierarchical clustering routine R4; (ii) the hierarchical clustering routine R2 is configured to process the first resultant cluster generated by the hierarchical clustering routine R1 to generate three resultant clusters and provide a first resultant cluster to the hierarchical clustering routine R5, a second resultant cluster to the hierarchical clustering routine R6, and a third resultant cluster to the hierarchical clustering routine R7; (iii) the hierarchical clustering routine R3 is configured to process the second resultant cluster generated by the hierarchical clustering routine R1 to generate three resultant clusters and provide a first resultant cluster to the hierarchical clustering routine R8, a second resultant cluster to the hierarchical clustering routine R9, and a third resultant cluster to the hierarchical clustering routine R10; (iv) the hierarchical clustering routine R4 is configured to process the third resultant cluster generated by the hierarchical clustering routine R1 to generate three resultant clusters and provide a first resultant cluster to the hierarchical clustering routine R11, a second resultant cluster to the hierarchical clustering routine R12, and a third resultant cluster to the hierarchical clustering routine R13; (v) the hierarchical clustering routine R5 is configured to process the first resultant cluster generated by the hierarchical clustering routine R2 to generate an optimal number of final hierarchical clusters; (vi) the hierarchical clustering routine R6 is configured to process the second resultant cluster generated by the hierarchical clustering routine R2 to generate an optimal number of final hierarchical clusters; (vii) the hierarchical clustering routine R7 is configured to process the third resultant cluster generated by the hierarchical clustering routine R2 to generate an optimal number of final hierarchical clusters; (viii) the hierarchical clustering routine R8 is configured to process the first resultant cluster generated by the hierarchical clustering routine R3 to generate an optimal number of final hierarchical clusters; (ix) the hierarchical clustering routine R9 is configured to process the second resultant cluster generated by the hierarchical clustering routine R3 to generate an optimal number of final hierarchical clusters; (x) the hierarchical clustering routine R10 is configured to process the third resultant cluster generated by the hierarchical clustering routine R3 to generate an optimal number of final hierarchical clusters; (xi) the hierarchical clustering routine R11 is configured to process the first resultant cluster generated by the hierarchical clustering routine R4 to generate an optimal number of final hierarchical clusters; (xii) the hierarchical clustering routine R12 is configured to process the second resultant cluster generated by the hierarchical clustering routine R4 to generate an optimal number of final hierarchical clusters; and (xii) the hierarchical clustering routine R13 is configured to process the third resultant cluster generated by the hierarchical clustering routine R4 to generate an optimal number of final hierarchical clusters.

An operational example of performing step/operation 401 is depicted in FIG. 5. Although the operational example that is depicted in FIG. 5 includes three hierarchical clustering levels, a person of ordinary skill in the relevant technology will recognize that a hierarchical clustering may have any number of two or more hierarchical clustering levels. In some embodiments, the number of desired hierarchical clustering levels is determined based at least in part on a level count hyper-parameter of the predictive data analysis computing entity 106. In some embodiments, the predictive data analysis computing entity 106 may perform hierarchical clustering using as many hierarchical clustering levels as needed to satisfy a clustering error threshold condition (e.g., using as many hierarchical clustering levels as needed to achieve a clustering error measure that falls below a clustering error threshold).

As depicted in FIG. 5, the hierarchical clustering levels includes an initial hierarchical clustering level 501 that includes an initial hierarchical clustering routine 511. The initial hierarchical clustering routine 511 is configured to process an input data tier 521 to generate a group of resultant clusters that are then fed as inputs to the second hierarchical clustering level 502. The initial hierarchical clustering routine 511 may be configured to perform the following operations: (i) determining an optimal cluster count for the initial hierarchical clustering routine 511, (ii) performing clustering (e.g., using a k-means clustering algorithm) of the input data tier 521 into a number of clusters described by the optimal cluster count to generate a group of resultant clusters, and (iii) for each resultant cluster, determining an intra-cluster distance measure. The input data tier 521 may describe a group of input data objects that are provided as initial inputs to a clustering hierarchy. For example, the input data tier 521 may include a group of claim data objects, for example a group of health insurance claim data objects that each describes one or more properties of a health insurance claim. In some embodiments, the input data tier 521 includes all of the claim data objects for a current period (e.g., for a current month) and a random sample of claim data objects for a prior period (e.g., for previous 11 months), where the count of the claim data objects in the random sample may be determined based at least in part on (e.g., may be equal to) the count of the claim data object in the current period.

As further depicted in FIG. 5, the hierarchical clustering levels include a second-level hierarchical clustering level 502 that includes a particular number of second-level hierarchical clustering routines 512, where the number of second-level hierarchical clustering routines 512 may be determined based on the number of resultant clusters generated by the initial hierarchical clustering routine 511. Each second-level hierarchical clustering routine 512 may be configured to: (i) determine an optimal cluster count for the second-level hierarchical clustering routine 512, (ii) perform clustering (e.g., using a k-means clustering algorithm) of a corresponding resultant cluster generated by the initial hierarchical clustering routine 511 to generate a group of resultant clusters for the second-level hierarchical clustering routine 512, and (iii) for each resultant cluster for the second-level hierarchical clustering routine 512, determine an intra-cluster distance measure.

As further depicted in FIG. 5, the hierarchical clustering levels include a final hierarchical clustering level 503 that includes a number of final hierarchical clustering routines 513, where the number of final hierarchical clustering routines may be determined by the number of resultant clusters generated by the second-level hierarchical clustering routines 512. Each final hierarchical clustering routine 513 may be configured to: (i) determine an optimal cluster count for the final hierarchical clustering routine 513, (ii) perform clustering (e.g., using a k-means clustering algorithm) of a corresponding resultant cluster generated by the second hierarchical clustering level 502 to generate a group of final hierarchical clusters 522, and (iii) for each final hierarchical cluster, determine an intra-cluster distance measure.

As described above, each hierarchical clustering routine may be configured to determine an optimal cluster count. The optimal cluster count for a hierarchical clustering routine may describe a number of desired clusters to generate by the hierarchical clustering routine in order to maximize a clustering accuracy and/or a clustering efficiency of the hierarchical clustering routine. In some embodiments, to determine the optimal cluster count for a particular hierarchical clustering routine, the predictive data analysis computing entity 106 is configured to: (i) identify a group of input data objects associated with the resultant cluster (e.g., for an initial hierarchical clustering routine, this group may entail the input data tier, while for a non-initial hierarchical clustering routine, this group may entail a corresponding resultant cluster generated by a parent hierarchical clustering routine); (ii) identify (e.g., generate) a plurality of candidate clustering arrangements for the group of input data objects, where each candidate clustering arrangement is associated with a cluster count and associates each input data object of the group of input data objects to a proposed cluster; (iii) for each candidate clustering arrangement of the plurality of candidate clustering arrangements, determine a silhouette intra-cluster distance measure for the input cluster in relation to the candidate clustering arrangement (e.g., where the silhouette intra-cluster distance measure for a candidate clustering arrangement may describe a measure of how proximate each input data object is to the proposed cluster for the input data object in accordance with the candidate clustering arrangement and how distant each input data object is to clusters other than the proposed cluster for the input data object in accordance with the candidate clustering arrangement); and (iv) determine the optimal cluster count based at least in part on a cluster count of the candidate clustering arrangement of the plurality of candidate clustering arrangements that has a lowest silhouette intra-cluster distance measure.

As further described above, each hierarchical clustering routine may be configured to generate an intra-cluster distance measure for each resultant cluster generated by the hierarchical clustering routine. The intra-cluster distance measure for a resultant cluster (e.g., a resultant cluster generated by a non-final hierarchical clustering routine or a final hierarchical cluster generated by a final hierarchical clustering routine) may describe a measure of similarity of the clustered input data objects that are deemed to be in the resultant cluster.

The intra-cluster distance measure for a resultant cluster may provide predictive insights about which resultant clusters can be ignored due to having a large volume of dissimilar clustered data objects (e.g., a large volume of dissimilar claim data objects). In some embodiments, the intra-cluster distance measure for a resultant cluster is determined based at least in part on a mean vector normalization of each clustered data object in the resultant cluster minus the cluster centroid (e.g., the cluster mean).

In some embodiments, the intra-cluster distance measure for a resultant cluster is determined by performing the following operations: (i) identifying a group of input data objects associated with the resultant cluster (e.g., for an initial hierarchical clustering routine, this group may entail the input data tier, while for a non-initial hierarchical clustering routine, this group may entail a corresponding resultant cluster generated by a parent hierarchical clustering routine); (ii) for each input data object of the group of input data objects, determining a point-centroid distance measure of the input data object from a centroid data object for the resultant cluster; and (iii) determining an intra-cluster distance measure for the resultant cluster based at least in part on each point-centroid distance measure for an input data object of the group of input data objects.

Returning to FIG. 4, at step/operation 402, the predictive data analysis computing entity 106 determines an intra-cluster variable importance measure for each the cluster-feature pair that is associated with a final hierarchical cluster of the group of final hierarchical clusters and a related one-hot-encoded feature of the group of related one-hot-encoded features for the final hierarchical cluster. Although various embodiments of the present invention describe generating intra-cluster variable importance measures for final hierarchical clusters and their related one-hot-encoded features, a person of ordinary skill in the relevant technology that: (i) intra-cluster variable importance measures may be generated for non-final hierarchical clusters (e.g., initial hierarchical clusters generated by an initial hierarchical clustering routines, non-initial non-final hierarchical clusters generated by non-initial, non-final hierarchical clustering routines such as second-level hierarchical clusters generated by second-level hierarchical clustering routines, and/or the like); and (ii) intra-cluster variable importance measures for clusters may be generated with respect to one-hot-encoded features other than those one-hot-encoded features deemed related to the noted clusters.

An intra-cluster variable importance measure may describe an inferred significance of a one-hot-encoded feature to common clustering of a group of clustered input data objects in a particular cluster. In some embodiments, the intra-cluster variable importance measures for a group of one-hot-encoded features with respect to a group of clusters may be determined based at least in part on training a classifier machine learning model that classifies a group of input data objects into a group of classifications determined based at least in part on the group of clusters, and then determining feature importance measures for the one-hot-encoded features with respect to the group of classifications as determined based at least in part on performing feature importance determinations operations with respect to the trained classifier machine learning model. For example, in some embodiments, the intra-cluster variable importance measures for a group of one-hot-encoded features with respect to a group of clusters may be determined based at least in part on training a random forest classifier machine learning model that classifies a group of input data objects into a group of classifications determined based at least in part on the group of clusters, and then determining feature importance measures for the one-hot-encoded features with respect to the group of classifications as determined based at least in part on performing feature importance determinations operations with respect to the trained random forest classifier machine learning model.

As described above, in some embodiments, intra-cluster variable importance measures are determined for each final hierarchical cluster in a group of final hierarchical clusters generated by a group of final hierarchical clustering routines in a final hierarchical clustering level with respect to the related one-hot-encoded features for the noted final hierarchical cluster. A related one-hot-encoded feature for a cluster may be a one-hot-encoded feature (i.e., a Boolean-valued feature) whose corresponding value is affirmative for at least one clustered data object in the cluster. For example, consider a cluster that includes three claim data objects C1-C3 as well a one-hot-encoded feature that describes whether a claim data object is associated with a particular International Classification of Disease (ICD) code. In the noted example, the one-hot-encoded feature is deemed related to the cluster if at least one of the following conditions is true: (i) the claim data object C1 is associated with the particular ICD code, (ii) the claim data object C2 is associated with the particular ICD code, and (iii) the claim data object C3 is associated with the particular ICD code.

In some embodiments, step/operation 402 may be performed in accordance with the process that is depicted in FIG. 6 to generate an intra-cluster variable importance measure for a cluster-feature pair that includes a particular final hierarchical cluster and a related one-hot-encoded feature for the final hierarchical cluster. The process that is depicted in FIG. 6 begins at step/operation 601 when the predictive data analysis computing entity 106 identifies (e.g., generates and/or trains) a trained random forest classifier machine learning model. The trained random forest classifier machine learning model may be configured to perform classification of a group of input data objects for a final hierarchical cluster in accordance with a group of classifications characterized by the group of final hierarchical clusters. In some embodiments, the trained random forecast classifier machine learning comprises a group of random forest tree data objects. In some embodiments, each random forest tree data object of the trained random forest classifier machine learning model comprises a group of random forest tree node data objects, where each random forest tree node data object for a random forest tree data object is associated with a one-hot-encoded feature of a group of one-hot-encoded features. In some of the noted embodiments, the group of one-hot-encoded features comprises the group of related one-hot-encoded features for the final hierarchical cluster.

A trained random forest classifier machine learning model may be a machine learning model that includes a number of random forest tree data objects. Each random forest tree data object may describe a group of hierarchical decisions each corresponding to a random forest tree node data object, where hierarchical decisions at a final hierarchical level lead to determining a classification for an input data object. For example, an exemplary random forest tree data object may describe that following hierarchy of decision making operations: (i) if an input data object has an affirmative value for one-hot-encoded feature F1, take branch B1_1, otherwise take branch B1_2; (ii) in branch B1_1, if the input data object has an affirmative value for one-hot-encoded feature F2, take branch B2_1, otherwise, take branch B2_2; (iii) in branch B1_2, if the input data object has an affirmative value for one-hot-encoded feature F3, take branch B3_1, otherwise, take branch B3_2; (iv) in branch B2_1, if the input data object has an affirmative value for one-hot-encoded feature F3 classify as C1, otherwise classify as C2; (v) in branch B2_2, if the input data object has an affirmative value for one-hot-encoded feature F4 classify as C3, otherwise classify as C2; (vi) in branch B3_1, if the input data object has an affirmative value for one-hot-encoded feature F4 classify as C1, otherwise classify as C3; and (vii) in branch B3_3, if the input data object has an affirmative value for one-hot-encoded feature F2 classify as C3, otherwise classify as C2. In the noted example, each of the decision making operations described in (iv)-(vii) corresponds to a random forest tree node data object. As illustrated by this example, each random forest tree node data object corresponds to a one-hot-encoded feature: random forest tree node data object (i) corresponds to the one-hot-encoded feature F 1, random forest tree node data object (ii) corresponds to the one-hot-encoded feature F2, random forest tree node data object (iii) corresponds to the one-hot-encoded feature F3, random forest tree node data object (iv) corresponds to the one-hot-encoded feature F3, random forest tree node data object (v) corresponds to the one-hot-encoded feature F4, random forest tree node data object (vi) corresponds to the one-hot-encoded feature F4, and random forest tree node data object (vii) corresponds to the one-hot-encoded feature F2.

In some embodiments, the inputs to a trained random forest classifier machine learning model include a group of input data objects, where each input data object may be a vector. In some embodiments, the output of a trained random forest classifier machine learning model may be a vector that identifies, for each candidate classification of a group of candidate classifications, a likelihood that the candidate classification relates to the input data object. In some embodiments, the output of a trained random forest classifier machine learning model may be a vector or atomic value that describes a proposed classification for an input data object.

At step/operation 602, the predictive data analysis computing entity 106 determines a node-wise importance measure for each random forest tree node data object in the trained random forest classifier machine learning model. The node-wise feature importance measure for a random forest tree node data object may describe an inferred importance of the random forest tree node data object to a random forest tree data object that includes the random forest tree node data object. In some embodiments, the node-wise feature importance measure for a random forest tree node data object n in a random forest tree data object t is determined based at least in part on the output of equation: [(total number of input data objects that reach n (e.g., that are provided as inputs to n after successfully passing prior decision making operations that lead to n)/total number of input data objects that are provided as inputs to t)*an inferred impurity measure for input data objects that reach n]−[(total number of input data objects that satisfy n/total number of input data objects that are provided as inputs to t)*an inferred impurity measure for those input data objects that satisfy n]−[(total number of input data objects that fail to satisfy n/total number of input data objects that are provided as inputs to t)*an inferred impurity measure for those input data objects that fail to satisfy n].

At step/operation 603, the predictive data analysis computing entity 106 determines a normalized feature importance measure for each feature-tree pair that includes a one-hot-encoded feature of the group of one-hot-encoded features and a random forest tree data object of the group of random forest tree data objects. The normalized feature importance measure for a feature-tree pair describes an inferred importance of a one-hot-encoded feature (which may be associated with one or more random forest tree node data objects in a random forest tree data object) associated with the feature-tree pair and a random forest tree data object associated with the feature-tree pair. Because a particular one-hot-encoded feature may be associated with two or more random forest tree node data objects, in some embodiments, each node-wise importance measure for a random forest tree node data object that is both associated with the particular one-hot-encoded feature and is in a particular random forest tree data object should be combined to generate the normalized feature importance measure for a feature-tree pair that includes the particular one-hot-encoded feature and the particular random forest tree data object. In some embodiments, the normalized feature importance measure for a one-hot-encoded feature may be determined by normalizing the non-normalized feature importance measure for the one-hot-encoded feature in accordance with the sum of non-normalized feature importance measures for all one-hot-encoded features used to generate the random forest classification machine learning model that includes the corresponding random forest tree data object, e.g., based at least in part on the output of the equation: [non-normalized feature importance measures for a particular one-hot-encoded feature]/[sum of non-normalized feature importance measures for all one-hot-encoded features]. In some embodiments, the non-normalized feature importance measure for a one-hot-encoded feature fin relation to a random forest tree data object t is determined using the equation: [(sum of node-wise importance measures for all random forest tree node data objects in t that correspond to f)/(sum of all node-wise importance measures for all random forest tree node data objects in t)].

At step/operation 604, the predictive data analysis computing entity 106 determines a feature-wise importance measure for each one-hot-encoded feature of the group of one-hot-encoded features. The feature-wise importance measure may describe an inferred importance of the corresponding one-hot-encoded feature to all of the random forest tree data objects associated with the random forest classification machine learning model. The feature-wise importance measure for a particular one-hot-encoded feature may be determined by combining each normalized feature importance measure for a feature-tree pair that includes the particular one-hot-encoded feature. In some embodiments, the feature-wise importance for a one-hot-encoded feature f across a set of random forest tree data objects Tis determined based at least in part on the output of: [sum of all normalized feature importance measures for f across T/count of random forest tree data objects in T].

At step/operation 605, the predictive data analysis computing entity 106 determines a class feature importance for the particular related one-hot-encoded feature in the cluster-feature pair (i.e., the cluster-feature pair with respect to which the intra-cluster variable importance measure is being calculated) with respect to the particular final hierarchical cluster in the cluster-feature pair. The class feature importance for a one-hot-encoded feature in a cluster-feature pair with respect to a cluster in a cluster-feature pair may describe an inferred significance of the one-hot-encoded feature to determining a classification associated with the cluster. In some embodiments, determining a class feature importance measure for a related one-hot-encoded feature that is associated with a cluster-feature pair to a final hierarchical cluster that is associated with the cluster-feature pair is performed based at least in part on a mean of each feature split for the related one-hot-encoded feature across a classification that is associated with the final hierarchical cluster.

At step/operation 606, the predictive data analysis computing entity 106 determines the intra-cluster variable importance measure based at least in part on the class feature importance measure and a total occurrence count measure for the particular related one-hot-encoded feature. In some embodiments, the predictive data analysis computing entity 106 multiplies the class feature importance measure for a the cluster-feature pair and a total occurrence count measure for the related one-hot-encoded feature with respect to the final hierarchical cluster that is associated with the cluster-feature pair to generate the intra-variable importance measure for the cluster-feature pair. The actual occurrence count measure for a one-hot-encoded feature with respect to a cluster may describe a count of clustered data objects in the cluster that have an affirmative value with respect to the one-hot-encoded feature. For example, consider a cluster that includes three claim data objects C1-C3 as well a one-hot-encoded feature that describes whether a claim data object is associated with a particular International Classification of Disease (ICD) code. In the noted example, if C1 and C3 have the particular ICD code but C2 does not have the particular ICD code, then the actual occurrence count measure for the one-hot-encoded feature with respect to the cluster may be two.

Returning to FIG. 4, at step/operation 403, the predictive data analysis computing entity 106 determines an incremental representation measure for each the cluster-feature pair that is associated with a final hierarchical cluster of the group of final hierarchical clusters and a related one-hot-encoded feature of the group of related one-hot-encoded features for the final hierarchical cluster. Although various embodiments of the present invention describe generating incremental representation measures for final hierarchical clusters and their related one-hot-encoded features, a person of ordinary skill in the relevant technology that: (i) incremental representation measures may be generated for non-final hierarchical clusters (e.g., initial hierarchical clusters generated by an initial hierarchical clustering routines, non-initial non-final hierarchical clusters generated by non-initial, non-final hierarchical clustering routines such as second-level hierarchical clusters generated by second-level hierarchical clustering routines, and/or the like); and (ii) incremental representation measures for clusters may be generated with respect to one-hot-encoded features other than those one-hot-encoded features deemed related to the noted clusters.

An incremental representation measure for a cluster-feature pair may describe an inferred uniqueness of the one-hot-encoded feature associated with the cluster-feature pair to the cluster associated with the cluster-feature pair. The incremental representation measure for a cluster-feature pair may provide predictive insights about which one-hot-encoded features are most unique to a cluster, and which are ubiquitous across all/most clusters. This may enable a claims analyst to quickly identify which one-hot-encoded features can be focused on as potentially interesting based at least in part on them being specific to a cluster versus homogenous across the entire claims data set. In some embodiments, an incremental representation measure for a cluster-feature pair may be determined based at least in part on: (i) an expected occurrence count measure for the one-hot-encoded feature associated with the cluster-feature pair within the cluster associated with the cluster-feature pair, and (ii) an actual occurrence count measure for the one-hot-encoded feature associated with the cluster-feature pair within the cluster associated with the cluster-feature pair.

In some embodiments, step/operation 403 may be performed in accordance with the process that is depicted in FIG. 7 to determine the incremental representation measure for a cluster-feature pair that includes a particular final hierarchical cluster and a particular related one-hot-encoded feature for the particular final hierarchical cluster. The process that is depicted in FIG. 7 begins at step/operation 701 when the predictive data analysis computing entity 106 determines a cluster weight for the particular final hierarchical cluster. The cluster weight for a cluster may describe a ratio of the count of clustered data objects in the cluster (i.e., the intra-cluster count of the cluster) to the total count of data objects in the input data tier associated with a hierarchical clustering performed to generate the particular cluster. In some embodiments, the cluster weight for a cluster c in a cluster hierarchy h is determined based at least in part on the output of: [count of clustered data objects in c/count of input data objects provided as inputs to h].

At step/operation 702, the predictive data analysis computing entity 106 determines an expected occurrence count measure for the cluster-feature pair based at least in part on the cluster weight for the final hierarchical cluster that is associated with the cluster-feature pair. The expected occurrence count measure for a cluster-feature pair may describe an expected count of clustered data objects in the corresponding cluster that are expected to have an affirmative value for the corresponding one-hot-encoded feature. In some embodiments, the expected occurrence count measure for a cluster-feature pair is determined based at least in part on the cluster weight for the cluster in the cluster-feature pair and a total occurrence count measure for the one-hot-encoded feature across the input data tier (i.e., the count of all input data objects in the input data tier that have an affirmative value for the one-hot-encoded feature). In some embodiments, the expected occurrence count measure for a cluster-feature pair that includes a cluster c and a feature f is determined based at least in part on the output of: [count of affirmative occurrence of f across the input data tier/cluster weight for c].

At step/operation 703, the predictive data analysis computing entity 106 identifies (e.g., determines) an actual occurrence count measure for the cluster-feature pair based at least in part on the cluster weight for the final hierarchical cluster that is associated with the cluster-feature pair. The actual occurrence count measure for a cluster-feature pair may describe an actual count of clustered data objects in the corresponding cluster that have an affirmative value for the corresponding one-hot-encoded feature. For example, consider a cluster that includes three claim data objects C1-C3 as well a one-hot-encoded feature that describes whether a claim data object is associated with a particular International Classification of Disease (ICD) code. In the noted example, if C1 and C3 have the particular ICD code but C2 does not have the particular ICD code, then the actual occurrence count measure for the one-hot-encoded feature with respect to the cluster may be two.

At step/operation 704, the predictive data analysis computing entity 106 determines the incremental representation measure for the cluster-feature pair based at least in part on the expected occurrence count measure for the cluster-feature pair and the actual occurrence count measure for the cluster-feature pair. In some embodiments, the incremental representation measure for a cluster-feature pair that includes a cluster c and a feature f is determined based at least in part on the output of: [(actual variable count measure for c and f− expected variable count measure for c and f)/total count of clustered input data objects in c].

Returning to FIG. 4, at step/operation 404, the predictive data analysis computing entity 106 determines an overall variable importance measure for each the cluster-feature pair that is associated with a final hierarchical cluster of the group of final hierarchical clusters and a related one-hot-encoded feature of the group of related one-hot-encoded features for the final hierarchical cluster. Although various embodiments of the present invention describe generating overall variable importance measures for final hierarchical clusters and their related one-hot-encoded features, a person of ordinary skill in the relevant technology that: (i) overall variable importance measures may be generated for non-final hierarchical clusters (e.g., initial hierarchical clusters generated by an initial hierarchical clustering routines, non-initial non-final hierarchical clusters generated by non-initial, non-final hierarchical clustering routines such as second-level hierarchical clusters generated by second-level hierarchical clustering routines, and/or the like); and (ii) overall variable importance measures for clusters may be generated with respect to one-hot-encoded features other than those one-hot-encoded features deemed related to the noted clusters.

An overall variable importance measure may describe an inferred significance of the one-hot-encoded feature associated with the cluster-feature pair to the cluster associated with the cluster-feature pair and an inferred uniqueness of the one-hot-encoded feature associated with the cluster-feature pair to the cluster associated with the cluster-feature pair. In some embodiments, the overall variable importance measure for a cluster-feature pair is determined based at least in part on an intra-cluster variable importance measure for the cluster-feature pair and an incremental representation measure for the cluster-feature pair. In some embodiments, the overall variable importance measure for a cluster-feature pair that includes a cluster c and a feature f is determined based at least in part on the output of: [(2*intra-cluster variable importance measure for c and f*incremental representation measure for c and j)/(intra-cluster variable importance measure for c and f+ incremental representation measure for c and f)].

At step/operation 405, the predictive data analysis computing entity 106 generates predicted explanatory metadata for the group of hierarchical clustering routines based at least in part on each overall variable importance measure for each cluster-feature pair of the group of cluster-feature pairs. In some embodiments, the predicted explanatory metadata describes at least one of: (i) each intra-cluster variable importance measure for a cluster-feature pair, (ii) each incremental representation measure for a cluster-feature pair, and (iii) each overall variable importance measure for a cluster-feature pair.

At step/operation 406, the predictive data analysis computing entity 106 performs one or more prediction-based actions based at least in part on the predicted explanatory metadata. In some embodiments, the predictive data analysis computing entity 106 causes display (e.g., by a client computing device 102) of a prediction output user interface that describes the predicted explanatory metadata. An operational example of a prediction output user interface 800 is depicted in FIG. 8. As depicted in FIG. 8, the prediction output user interface 800 describes overall variable importance measures for a cluster selected using the user interface element 801.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
performing, by one or more processors and using a classifier machine learning model that comprises a plurality of tree node data objects, a group of hierarchical clustering routines to generate a group of one or more final hierarchical clusters, wherein:
  (i) the group of hierarchical clustering routines:
    (a) is associated with the plurality of tree node data objects, and
    (b) comprises at least one hierarchical clustering routine that is configured to:
      (1) generate one or more resultant clusters from input data based at least in part on one or more parent hierarchical clustering routines, and
      (2) provide the one or more resultant clusters to one or more child hierarchical clustering routines, and
  (ii) a final hierarchical cluster of the group of one or more final hierarchical clusters;
    (a) is associated with a related feature, and
    (b) comprises a group of clustered input data objects;
determining, by the one or more processors and for a cluster-feature pair that is associated with the final hierarchical cluster, an intra-cluster variable importance measure that represents an inferred significance of the related feature to a common clustering of the group of clustered input data objects, wherein determining the intra-cluster variable importance measure;
  (1) comprises determining a feature importance measure for the related feature with respect to a classification of the group of one or more final hierarchical clusters, wherein the feature importance measure comprises a node-wise feature importance measure that is based at least in part on a subtraction of a second value and third value from a first value, wherein:

(i) the first value is determined by dividing a first total number of a set of one or more first input data objects that are provided to a first tree node data object of the plurality of tree node data objects by a first product comprising a second total number of a set of one or more second input data objects that are provided to a tree data object and a first impurity measure for the set of one or more first input data objects, (ii) the second value is determined by dividing a third total number of a set of one or more third input data objects that satisfy the first tree node data object by a second product comprising the second total number of the set of one or more second input data objects and a second impurity measure for the set of one or more third input data objects, and (iii) the third value is determined by dividing a fourth total number of a set of one or more fourth input data objects that do not satisfy the first tree node data object by a third product comprising the second total number of the set of one or more second input data objects and a third impurity measure for the set of one or more fourth input data objects; and (2) is based at least in part on the feature importance measure;

determining, by the one or more processors, an incremental representation measure for the cluster-feature pair wherein the incremental representation measure represents an inferred uniqueness of the related feature to the final hierarchical cluster;

determining, by the one or more processors, an overall variable importance measure for the cluster-feature pair based at least in part on the intra-cluster variable importance measure and the incremental representation measure;

generating, by the one or more processors and using the classifier machine learning model, a prediction based at least in part on the group of one or more final hierarchical clusters;

generating, by the one or more processors, predicted explanatory metadata for the group of hierarchical clustering routines based at least in part on the overall variable importance measure for the cluster-feature pair; and training, by the one or more processors, the classifier machine learning model based at least in part on the predicted explanatory metadata, wherein the predicted explanatory metadata causes a decrease in processing power or storage resources.

2. The computer-implemented method of claim 1, wherein:

a select hierarchical clustering routine that is in a non-initial subset of the group of hierarchical clustering routines is associated with a current hierarchical clustering level of a plurality of hierarchical clustering levels and a parent hierarchical clustering level of the plurality of hierarchical clustering levels, the select hierarchical clustering routine that is in the non-initial subset is associated with a parent hierarchical clustering routine of the group of hierarchical clustering routines that is in the parent hierarchical clustering level for the select hierarchical clustering routine, the select hierarchical clustering routine is configured to cluster an input cluster that is generated by the parent hierarchical clustering routine for the select hierarchical clustering routine to generate a group of resultant clusters, and the select hierarchical clustering routine is configured to determine the group of one or more final hierarchical clusters based at least in part on a final group of resultant clusters that is generated by a final hierarchical clustering routine in the non-initial subset that comprises a current hierarchical clustering level that is a final hierarchical clustering level of the plurality of hierarchical clustering levels.

3. The computer-implemented method of claim 2, wherein the select hierarchical clustering routine is configured to generate the group of resultant clusters by:

identifying a plurality of candidate clustering arrangements for the input cluster;

for a select candidate clustering arrangement of the plurality of candidate clustering arrangements, determining a silhouette intra-cluster distance measure for the input cluster in relation to the select candidate clustering arrangement; and determining a desired cluster count based at least in part on a candidate clustering arrangement of the plurality of candidate clustering arrangements that comprises a lowest silhouette intra-cluster distance measure.

4. The computer-implemented method of claim 2, further comprising:

for one or more resultant clusters of the group of resultant clusters:

identifying a group of resultant input data objects that is associated with the one or more resultant clusters, for one or more resultant input data objects of the group of resultant input data objects, determining one or more point-centroid distance measures of the one or more resultant input data objects from one or more centroid data objects for the one or more resultant clusters, and determining one or more intra-cluster distance measures for the one or more resultant clusters based at least in part on the one or more point-centroid distance measures for the one or more resultant input data objects.

5. The computer-implemented method of claim 1, wherein:

(i) the classifier machine learning model comprises a trained random forest classifier machine learning model that is configured to perform classification in accordance with a group of classifications characterized by the group of one or more final hierarchical clusters, (ii) the plurality of tree node data objects comprise a group of random forest tree data objects, (iii) a select random forest tree data object of the group of random forest tree data objects comprises a group of random forest tree node data objects, (iv) a select random forest tree node data object of the group of random forest tree node data objects for the select random forest tree data object of the group of random forest tree data objects is associated with a feature of a group of features, (v) the group of features comprises a group of related features for the final hierarchical cluster, and (vi) determining the intra-cluster variable importance measure for the cluster-feature pair comprises:

for the select random forest tree node data object, determining a node-wise importance measure for the select random forest tree node data object with respect to the select random forest tree data object;

for a select feature-tree pair of a group of feature-tree pairs that comprises the feature and a random forest tree data object of the group of random forest tree data objects, determining a normalized feature-tree importance measure based at least in part on each node-wise importance measure for a random forest tree node data object of the group of random forest tree node data objects of the select random forest tree data object that is associated with the feature;

determining a feature-wise importance measure for the related feature based at least in part on each normalized feature-tree importance measure for the select feature-tree pair;

determining a class feature importance measure for the related feature to the final hierarchical cluster based at least in part on a mean of each feature split for the related feature across a classification of the group of classifications that is associated with the final hierarchical cluster; and determining the intra-cluster variable importance measure based at least in part on the class feature importance measure and an actual occurrence count measure for the related feature with respect to the final hierarchical cluster.

6. The computer-implemented method of claim 1, wherein determining the incremental representation measure for the cluster-feature pair comprises:

determining a cluster weight for the final hierarchical cluster based at least in part on an intra-cluster count of the group of clustered input data objects and a total count of input data objects in an input data tier associated with the group of hierarchical clustering routines;

determining an expected occurrence count measure for the related feature within the final hierarchical cluster based at least in part on the cluster weight for the final hierarchical cluster and a total occurrence count measure for the related feature; and determining the incremental representation measure based at least in part on the expected occurrence count measure and an actual occurrence count measure.

7. The computer-implemented method of claim 1, wherein determining the overall variable importance measure is performed based at least in part on a ratio of a product output of the intra-cluster variable importance measure and the incremental representation measure and a summation output of the intra-cluster variable importance measure and the incremental representation measure.

8. The computer-implemented method of claim 1, wherein the group of hierarchical clustering routines comprise one or more k-means clustering routines.

9. The computer-implemented method of claim 8, wherein the one or more k-means clustering routines are associated with a level count hyper-parameter.

10. A system comprising
one or more processors and
at least one memory storing processor-executable instructions that, when executed by the one or more processors, cause the one or more processors to perform operations comprising:

performing, using a classifier machine learning model that comprises a plurality of tree node data objects, a group of hierarchical clustering routines to generate a group of one or more final hierarchical clusters, wherein:

(i) the group of hierarchical clustering routines:

(a) is associated with the plurality of tree node data objects, and (b) comprises at least one hierarchical clustering routine that is configured to:

(1) generate one or more resultant clusters from input data based at least in part on one or more parent hierarchical clustering routines, and (2) provide the one or more resultant clusters to one or more child hierarchical clustering routines, and (ii) a final hierarchical cluster of the group of one or more final hierarchical clusters;

(a) is associated with a related feature, and (b) comprises a group of clustered input data objects;

determining, for a cluster-feature pair that is associated with the final hierarchical cluster, an intra-cluster variable importance measure for the cluster-feature pair that represents an inferred significance of the related feature to a common clustering of the group of clustered input data objects, wherein determining the intra-cluster variable importance measure:

(1) comprises determining a feature importance measure for the related feature with respect to a classification of the group of one or more final hierarchical clusters, wherein the feature importance measure comprises a node-wise feature importance measure that is based at least in part on a subtraction of a second value and a third value from a first value, wherein:

(i) the first value is determined by dividing a first total number of a set of one or more first input data objects that are provided to a first tree node data object of the plurality of tree node data objects by a first product comprising a second total number of a set of one or more second input data objects that are provided to a tree data object and a first impurity measure for the set of one or more first input data objects, (ii) the second value is determined by dividing a third total number of a set of one or more third input data objects that satisfy the first tree node data object by a second product comprising the second total number of the set of one or more second input data objects and a second impurity measure for the set of one or more third input data objects, and (iii) the third value is determined by dividing a fourth total number of a set of one or more fourth input data objects that do not satisfy the first tree node data object by a third product comprising the second total number of the set of one or more second input data objects and a third impurity measure for the set of one or more fourth input data objects; and (2) is based at least in part on the feature importance measure;

determining an incremental representation measure for the cluster-feature pair wherein the incremental representation measure represents an inferred uniqueness of the related feature to the final hierarchical cluster;

determining an overall variable importance measure for the cluster-feature pair based at least in part on the intra-cluster variable importance measure and the incremental representation measure;

generating, using the classifier machine learning model, a prediction based at least in part on the group of one or more final hierarchical clusters;

generating predicted explanatory metadata for the group of hierarchical clustering routines based at least in part on the overall variable importance measure for the cluster-feature pair; and training the classifier machine learning model based at least in part on the predicted explanatory metadata, wherein the predicted explanatory metadata causes a decrease in processing power or storage resources.

11. The system of claim 10, wherein:

a select hierarchical clustering routine that is in a non-initial subset of the group of hierarchical clustering routines is associated with a current hierarchical clustering level of a plurality of hierarchical clustering levels and a parent hierarchical clustering level of the plurality of hierarchical clustering levels, the select hierarchical clustering routine that is in the non-initial subset is associated with a parent hierarchical clustering routine of the group of hierarchical clustering routines that is in the parent hierarchical clustering level for the select hierarchical clustering routine, the select hierarchical clustering routine is configured to cluster an input cluster that is generated by the parent hierarchical clustering routine for the select hierarchical clustering routine to generate a group of resultant clusters, and the select hierarchical clustering routine is configured to determine the group of one or more final hierarchical clusters based at least in part on a final group of resultant clusters that is generated by a final hierarchical clustering routine in the non-initial subset that comprises a current hierarchical clustering level that is a final hierarchical clustering level of the plurality of hierarchical clustering levels.

12. The system of claim 11, wherein the select hierarchical clustering routine is configured to generate the group of resultant clusters by:

identifying a plurality of candidate clustering arrangements for the input cluster;

for a select candidate clustering arrangement of the plurality of candidate clustering arrangements, determining a silhouette intra-cluster distance measure for the input cluster in relation to the select candidate clustering arrangement; and determining a desired optimal cluster count based at least in part on a candidate clustering arrangement of the plurality of candidate clustering arrangements that comprises a lowest silhouette intra-cluster distance measure.

13. The system of claim 11, wherein the operations further comprise:

for one or more resultant clusters of the group of resultant clusters:

identifying a group of resultant input data objects that is associated with the one or more resultant clusters, for one or more resultant input data objects of the group of resultant input data objects, determining one or more point-centroid distance measures of the one or more resultant input data objects from one or more centroid data objects for the one or more resultant clusters, and determining one or more intra-cluster distance measures for the one or more resultant clusters based at least in part on the one or more point-centroid distance measures for the one or more resultant input data objects.

14. The system of claim 10, wherein:

(i) the classifier machine learning model comprises a trained random forest classifier machine learning model that is configured to perform classification in accordance with a group of classifications characterized by the group of one or more final hierarchical clusters, (ii) the plurality of tree node data objects comprise a group of random forest tree data objects, (iii) a select random forest tree data object of the group of random forest tree data objects comprises a group of random forest tree node data objects, (iv) a select random forest tree node data object of the group of random forest tree node data objects for the select random forest tree data object of the group of random forest tree data objects is associated with a feature of a group of features, (v) the group of features comprises a group of related features for the final hierarchical cluster, and (vi) to determine the intra-cluster variable importance measure for the cluster-feature pair, the operations further comprise:

for the select random forest tree node data object, determining a node-wise importance measure for the select random forest tree node data object with respect to the select random forest tree data object;

for a select feature-tree pair of a group of feature-tree pairs that comprises the feature and a random forest tree data object of the group of random forest tree data objects, determining a normalized feature-tree importance measure based at least in part on each node-wise importance measure for a random forest tree node data object of the group of random forest tree node data objects of the select random forest tree data object that is associated with the feature;

determining a feature-wise importance measure for the related feature based at least in part on each normalized feature-tree importance measure for the select feature-tree pair;

determining a class feature importance measure for the related feature to the final hierarchical cluster based at least in part on a mean of each feature split for the related feature across a classification of the group of classifications that is associated with the final hierarchical cluster; and determining the intra-cluster variable importance measure based at least in part on the class feature importance measure and an actual occurrence count measure for the related feature with respect to the final hierarchical cluster.

15. The system of claim 10, wherein the operations further comprise:

determining a cluster weight for the final hierarchical cluster based at least in part on an intra-cluster count of the group of clustered input data objects and a total count of input data objects in an input data tier associated with the group of hierarchical clustering routines;

determining an expected occurrence count measure for the related feature within the final hierarchical cluster based at least in part on the cluster weight for the final hierarchical cluster and a total occurrence count measure for the related feature; and determining the incremental representation measure based at least in part on the expected occurrence count measure and an actual occurrence count measure.

16. One or more non-transitory computer-readable storage media including instructions that, when executed by one or more processors, cause the one or more processors to perform operations comprising:

performing, using a classifier machine learning model that comprises a plurality of tree node data objects, a group of hierarchical clustering routines to generate a group of one or more final hierarchical clusters, wherein:
(i) the group of hierarchical clustering routines:
   (a) is associated with the plurality of tree node data objects, and
   (b) comprises at least one hierarchical clustering routine that is configured to:
      (1) generate one or more resultant clusters from input data based at least in part on one or more parent hierarchical clustering routines, and
      (2) provide the one or more resultant clusters to one or more child hierarchical clustering routines, and
(ii) a final hierarchical cluster of the group of one or more final hierarchical clusters;
   (a) is associated with a related feature, and
   (b) comprises a group of clustered input data objects;
determining, for a cluster-feature pair that is associated with the final hierarchical cluster, an intra-cluster variable importance measure for the cluster-feature pair that represents an inferred significance of the related feature to a common clustering of the group of clustered input data objects, wherein determining the intra-cluster variable importance measure;
(1) comprises determining a feature importance measure for the related feature with respect to a classification of the group of one or more final hierarchical clusters, wherein the feature importance measure comprises a node-wise feature importance measure that is based at least in part on a subtraction of a second value and a third value from a first value, wherein:
   (i) the first value is determined by dividing a first total number of a set of one or more first input data objects that are provided to a first tree node data object of the plurality of tree node data objects by a first product comprising a second total number of a set of one or more second input data objects that are provided to a tree data object and a first impurity measure for the set of one or more first input data objects,
   (ii) the second value is determined by dividing a third total number of a set of one or more third input data objects that satisfy the first tree node data object by a second product comprising the second total number of the set of one or more second input data objects and a second impurity measure for the set of one or more third input data objects, and
   (iii) the third value is determined by dividing a fourth total number of a set of one or more fourth input data objects that do not satisfy the first tree node data object by a third product comprising the second total number of the set of one or more second input data objects and a third impurity measure for the set of one or more fourth input data objects; and
(2) is based at least in part on the feature importance measure;
determining an incremental representation measure for the cluster-feature pair wherein the incremental representation measure represents an inferred uniqueness of the related feature to the final hierarchical cluster;

determining an overall variable importance measure for the cluster-feature pair based at least in part on the intra-cluster variable importance measure and the incremental representation measure;
generating, using the classifier machine learning model, a prediction based at least in part on the group of one or more final hierarchical clusters;
generating predicted explanatory metadata for the group of hierarchical clustering routines based at least in part on the overall variable importance measure for the cluster-feature pair; and
training the classifier machine learning model based at least in part on the predicted explanatory metadata, wherein the predicted explanatory metadata causes a decrease in processing power or storage resources.

17. The one or more non-transitory computer-readable storage media of claim 16, wherein:
a select hierarchical clustering routine that is in a non-initial subset of the group of hierarchical clustering routines is associated with a current hierarchical clustering level of a plurality of hierarchical clustering levels and a parent hierarchical clustering level of the plurality of hierarchical clustering levels,
the select hierarchical clustering routine that is in the non-initial subset is associated with a parent hierarchical clustering routine of the group of hierarchical clustering routines that is in the parent hierarchical clustering level for the select hierarchical clustering routine,
the select hierarchical clustering routine is configured to cluster an input cluster that is generated by the parent hierarchical clustering routine for the select hierarchical clustering routine to generate a group of resultant clusters, and
the select hierarchical clustering routine to determine the group of one or more final hierarchical clusters based at least in part on a final group of resultant clusters that is generated by a final hierarchical clustering routine in the non-initial subset that comprises a current hierarchical clustering level that is a final hierarchical clustering level of the plurality of hierarchical clustering levels.

18. The one or more non-transitory computer-readable storage media of claim 17, wherein the select hierarchical clustering routine is configured to generate the group of resultant clusters by:
identifying a plurality of candidate clustering arrangements for the input cluster;
for a select candidate clustering arrangement of the plurality of candidate clustering arrangements, determining a silhouette intra-cluster distance measure for the input cluster in relation to the select candidate clustering arrangement; and
determining a desired optimal cluster count based at least in part on a candidate clustering arrangement of the plurality of candidate clustering arrangements that comprises a lowest silhouette intra-cluster distance measure.

19. The one or more non-transitory computer-readable storage media of claim 16, wherein;
(i) the classifier machine learning model comprises a trained random forest classifier machine learning model that is configured to perform classification in accordance with a group of classifications characterized by the group of one or more final hierarchical clusters, (ii) the plurality of tree node data objects comprise a group of random forest tree data objects, (iii) a select random forest tree data object of the group of random forest tree data objects comprises a group of random forest tree node data objects, (iv) a select random forest tree node data object of the group of random forest tree node data objects for the select random forest tree data object of the group of random forest tree data objects is associated with a feature of a group of features, (v) the group of features comprises a group of related features for the final hierarchical cluster, and (vi) to determine the intra-cluster variable importance measure for the cluster-feature pair, the operations further comprise:

for the select random forest tree node data object, determining a node-wise importance measure for the select random forest tree node data object with respect to the select random forest tree data object;

for a select feature-tree pair of a group of feature-tree pairs that comprises the feature and a random forest tree data object of the group of random forest tree data objects, determining a normalized feature-tree importance measure based at least in part on each node-wise importance measure for a random forest tree node data object of the group of random forest tree node data objects of the select random forest tree data object that is associated with the feature;

determining a feature-wise importance measure for the related feature based at least in part on each normalized feature-tree importance measure for the select feature-tree pair;

determining a class feature importance measure for the related feature to the final hierarchical cluster based at least in part on a mean of each feature split for the related feature across a classification of the group of classifications that is associated with the final hierarchical cluster; and determining the intra-cluster variable importance measure based at least in part on the class feature importance measure and an actual occurrence count measure for the related feature with respect to the final hierarchical cluster.

20. The one or more non-transitory computer-readable storage media of claim 16, wherein the operations further comprise:

determining a cluster weight for the final hierarchical cluster based at least in part on an intra-cluster count of the group of clustered input data objects and a total count of input data objects in an input data tier associated with the group of hierarchical clustering routines;

determining an expected occurrence count measure for the related feature within the final hierarchical cluster based at least in part on the cluster weight for the final hierarchical cluster and a total occurrence count measure for the related feature; and determining the incremental representation measure based at least in part on the expected occurrence count measure and an actual occurrence count measure.

* * * * *